US006713528B2

(12) United States Patent
Yamanouchi et al.

(10) Patent No.: US 6,713,528 B2
(45) Date of Patent: Mar. 30, 2004

(54) COLORING COMPOSITION, INK-JET INK AND INK JET RECORDING METHOD

(75) Inventors: Junichi Yamanouchi, Kanagawa (JP); Makoto Yamada, Kanagawa (JP)

(73) Assignee: Fuji Photo Film Co., Ltd., Minami Ashigara (JP)

( * ) Notice: Subject to any disclaimer, the term of this patent is extended or adjusted under 35 U.S.C. 154(b) by 0 days.

(21) Appl. No.: 09/800,776

(22) Filed: Mar. 8, 2001

(65) Prior Publication Data

US 2003/0222959 A1 Dec. 4, 2003

(30) Foreign Application Priority Data

Mar. 21, 2000 (JP) .................................... 2000-078518
Jul. 5, 2000 (JP) .................................... 2000-203856

(51) Int. Cl.⁷ .................. C09D 11/10; C08K 5/3445; C08K 5/3472; C08K 5/3432; C08K 5/3462
(52) U.S. Cl. ..................... 523/160; 524/87; 524/91; 524/94; 524/99
(58) Field of Search ................. 523/160, 161; 106/31.43, 31.49; 524/87, 91, 94, 104, 105, 106, 99

(56) References Cited

U.S. PATENT DOCUMENTS

| 4,246,154 | A | * | 1/1981 | Yao ............................. 524/88 |
| 4,692,188 | A | * | 9/1987 | Ober et al. .................. 523/200 |
| 5,302,437 | A | * | 4/1994 | Idei et al. .................... 428/195 |
| 5,508,421 | A | * | 4/1996 | Suzuki et al. ............. 548/262.4 |
| 5,753,017 | A | * | 5/1998 | Onodera et al. .......... 106/31.49 |
| 6,031,019 | A | * | 2/2000 | Tsutsumi et al. ........... 523/160 |
| 6,344,497 | B1 | * | 2/2002 | Meyrick et al. ............ 523/161 |
| 2001/0023267 | A1 | * | 9/2001 | Ishizuka et al. ............. 524/86 |

FOREIGN PATENT DOCUMENTS

| EP | 1035172 A2 | * | 9/2000 |
| JP | 56-157468 | | 12/1981 |
| JP | 58-45272 | | 3/1983 |
| JP | 03231975 A | * | 10/1991 |
| JP | 4-18468 | | 1/1992 |
| JP | 6-340835 | | 12/1994 |
| JP | 7-268254 | | 10/1995 |
| JP | 7-268257 | | 10/1995 |
| JP | 7-268260 | | 10/1995 |
| JP | 8-183920 | | 7/1996 |
| JP | 09059552 A | * | 3/1997 |
| JP | 10-110126 | | 4/1998 |
| JP | 10-195355 | | 7/1998 |
| JP | 10-279873 | | 10/1998 |
| JP | 11-286637 | | 10/1999 |
| JP | 11349874 A | * | 12/1999 |

OTHER PUBLICATIONS

English Tranlsation of JP 03231975 (1991).*
English Translation of JP 09059552 (1997).*
English Translation of JP 11349874 (1999).*

* cited by examiner

Primary Examiner—Callie Shosho
(74) Attorney, Agent, or Firm—Burns, Doane, Swecker & Mathis, L.L.P.

(57) ABSTRACT

An ink-jet ink which contains a coloring composition which is formed by dispersing coloring particulates in a water-based medium, and the coloring particulates containing a nonionic oil-soluble polymer, a hydrophobic high boiling point organic solvent having a boiling point of 150° C. or more, and an oil-soluble dye. Further, an ink jet recording method, in which recording is carried out using an ink-jet ink which contains a coloring composition, the coloring composition being formed by dispersing coloring particulates in a water-based medium, and the coloring particulates containing a nonionic oil-soluble polymer, a hydrophobic high boiling point organic solvent having a boiling point of 150° C. or more, and an oil-soluble dye.

18 Claims, No Drawings

COLORING COMPOSITION, INK-JET INK AND INK JET RECORDING METHOD

BACKGROUND OF THE INVENTION

1. Field of the Invention

The present invention relates to a coloring composition, an ink-jet ink containing the coloring composition and an ink jet recording method using the same, and more particularly to a coloring composition which has excellent color reproducibility and is suitable for a water-based ink for writing, water-based printing ink, information recording ink and the like, and for an ink-jet ink and an ink jet recording method suitable for a thermal, piezoelectric, electric field or acoustic ink jet method.

2. Description of the Related Art

Recently, with the spread of computers, ink jet printers are widely used for printing paper, film, cloth and the like not only in offices but also in the home. As ink-jet ink, oil-based, water-based and solid inks are known, and water-based ink is mainly used from the standpoints of production, handling properties, odor, safety and the like. However, most of the above-mentioned water-based inks have a problem in that they manifest poor water resistance and cause bleeding, which greatly lowers printing quality, when printed on so called normal paper since these inks use a water-soluble dye which is dissolved in a molecular state, and a problem in that they show poor light resistance, though they have merits of high transparency and high color concentration.

For solving the above-described problems, water-based inks using a pigment and dispersing dye are suggested, for example, in Japanese Patent Application Laid-Open (JP-A) Nos. 56-157468, 4-18468, 8-183920, 10-110126, 10-195355 and the like. However, in the case of these water-based inks, there are problems that water resistance is still in sufficient, although it is improved to a certain extent, storage stability of a pigment and a dispersion of a dispersing dye in the water-based ink are deficient, clogging tends to occur at an ink discharge port, and the like. Further, in these water-based inks, since hue is not sufficient, particularly hue of a magenta component is not sufficient in general, there is a problem with color reproducibility based on insufficient hue.

Further, recently, recording paper carrying on the surface thereof an ink receiving layer containing a porous inorganic pigment for obtaining high image quality (called photo quality paper) may sometimes be used in an ink jet recording method. However, with the above-mentioned water-based ink using a pigment and a dispersing dye, there are problems in that sinking into the above-mentioned photo quality paper is poor, and when the formed image is rubbed with a hand, pigment and dye tend to be peeled from the surface.

Japanese Patent Application Laid-Open (JP-A) Nos. 58-45272, 6-340835, 7-268254, 7-268257 and 7-268260 suggest a method in which dye is contained in a polyurethane or polyester particulate. However, the dispersions described in these publications have a problem that sufficient dispersion stability is not obtained when a dye of desired concentration is contained in the particulate. Further, the peeling problem occurring when the above-mentioned photo quality paper is used has not been solved yet.

Further, JP-A No. 10-279873 discloses a method in which an acrylic polymer and an oil-soluble dye are dissolved in an organic solvent, and the organic solvent is removed after dispersion, to produce a polymer coloring particulate. However, there are problems in recorded image quality, particularly recorded image quality when recorded on a photo quality paper medium, and in stability in continuous recording. Further, under current conditions, stability with the passing of time of a dispersion is also not sufficient.

SUMMARY OF THE INVENTION

An object of the present invention is to provide a coloring composition which is excellent in handling properties, odor, safety, and dispersion stability of coloring particulates, shows no paper-dependency, manifests excellent color developing property and hue when printed on any type of paper, and at the same time has excellent water resistance, light resistance and permeability into a receiving material, leaves no stain directly after printing, provides excellent stability of dye with the lapse of time, and is suitable for water-based ink for writing, water-based printing ink, information recording ink and the like. A further object of the present invention is to provide an ink-jet ink and an ink jet recording method which are suitable for a thermal, piezoelectric or acoustic ink jet method, prevent deposition of a dye with the passing of time, cause no clogging at the tip of a nozzle when printing are conducted using a nozzle or the like, even after a period of time, have no paper-dependency, provide excellent recording concentration and hue when printed on any type of paper and excellent ink permeability into photo quality paper, prevent staining directly after printing, and also are excellent in water resistance and light resistance.

The object described above can be achieved by the following means:

A first aspect of the present invention is an ink-jet ink which comprises a coloring composition which is formed by dispersing coloring particulates in a water-based medium, and the coloring particulates containing a nonionic oil-soluble polymer, a hydrophobic high boiling point organic solvent having a boiling point of 150° C. or more, and an oil-soluble dye.

A second aspect of the present invention is a coloring composition which is formed by dispersing coloring particulates in a water-based medium, and the coloring particulates containing a nonionic oil-soluble polymer, a hydrophobic high boiling point organic solvent having a boiling point of 150° C. or more, and an oil-soluble dye.

A third aspect of the present invention is an ink jet recording method, in which recording is carried out using an ink-jet ink which contains a coloring composition, the coloring composition being formed by dispersing coloring particulates in a water-based medium, and the coloring particulates containing a nonionic oil-soluble polymer, a hydrophobic high boiling point organic solvent having a boiling point of 150° C. or more, and an oil-soluble dye.

DESCRIPTION OF THE PREFERRED EMBODIMENTS

Description will be given hereinafter of a coloring composition, an ink-jet ink, and an ink jet recording method of the present invention.

[Coloring Composition]

A coloring composition of the present invention is formed by dispersing into a water-based medium coloring particulates containing a nonionic oil-soluble polymer, an oil-soluble dye, and a hydrophobic high boiling point organic solvent having a boiling point of 150° C. or more.

-Oil-Soluble Dye-

Of oil-soluble dyes usable in the present invention, any yellow dye can be used. For example, there can be used aryl or heterylazo dyes having phenols, naphthols, anilines, pirazolones, pyridones or opened-type active methylene compounds as a coupling component; azomethine dyes having opened-type active methylene compounds as a coupling component; methine dyes such as benzylidene dyes, monomethineoxonol dyes and the like, for example; quinone-based dyes such as naphthoquinone dyes, anthraquinone dyes and the like; and other compound. Additionally, dyes such as quinophthalone dyes, nitro·nitroso dyes, acrydine dyes, acrydinone dyes and the like can also be used.

Of oil-soluble dyes usable in the present invention, any magenta dye can be used. For example, there can be used aryl or heterylazo dyes having phenols, naphthols or anilines as a coupling component; azomethine dyes having pyrazolones or pyrazolotriazoles as a coupling component; methine dyes such as arylidene dyes, styryl dyes, merocyanine dyes or oxonol dyes; carbonium dyes such as diphenylmethane dyes, triphenylmethane dyes or xanthene dyes; quinone-based dyes such as naphthoquinone, anthraquinone, anthrapyridone and the like; condensed polycyclic dyes such as dioxazine dyes and the like; and other compounds.

Of oil-soluble dyes usable in the present invention, any cyan dye can be used. For example, there can be used azomethine dyes such as indoaniline dyes or indophenol dyes; polymethine dyes such as cyanine dyes, oxonol dyes, merocyanine dyes and the like; carbonium dyes such as diphenylmethane dyes, triphenylmethane dyes or xanthene dyes; phthalocyanine dyes; anthraquinone dyes; aryl or heterylazo dyes having phenols, naphthols or anilines as a coupling component; indigo·thioindigo dyes; and the like.

Though the above-mentioned each dye has a chromophore in the structure, there can also be used, in the present invention, dyes which do not develop color (yellow, magenta, cyan or the like) until decomposition of a part of the chromophore. As a counter cation to be decomposed, inorganic cations such as cations of alkali metals, ammonium ions and the like may be used, or organic cations such as pyridinium ions, quaternary ammonium ions and the like may be used and, further, polymer cations containing these cations as a part of the structure may also be used.

Specific examples of the oil-soluble dye include, but are not limited to, C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35 and 70; C.I. Solvent Green 3 and 7; and C.I. Solvent Orange 2, and the like. Of these, particularly preferable are Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Kagaku K. K.), Neopen Yellow 075, Neopen Magenta SE 1378, Neopen Blue 808, Neopen Blue FF 4012, Neopen Cyan FF 4238 (manufactured by BASF) and the like.

In the present invention, a dispersing dye can be used in an amount such that the dispersing dye is dissolved in a non-water miscible organic solvent, and preferable specific examples thereof include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; C.I. Disperse Green 6:1 and 9; and the like.

Of these, the above-mentioned oil-soluble dye is preferably a dye produced from a developing agent and a coupler by oxidation, the dye being utilized as a color photography material and, among others, dyes represented by the general formula (I) are preferable. Hereafter, the dye represented by the general formula (I) will be illustrated, and dyes in which at least one of groups in the general formula (I) is a group included in a preferable range shown below are preferable, and dyes in which more groups are in a preferable range are more preferable, and those in which all groups are in a preferable range are most preferable.

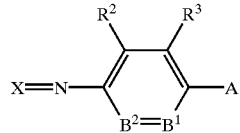

General formula (I)

In the above-mentioned general formula (I), X represents a residual group of a color coupler, A represents $-NR^4R^5$ or a hydroxy group, $R^4$ and $R^5$ each independently represents a hydrogen atom, aliphatic group, aromatic group or heterocyclic group. A is preferably $-NR^4R^5$. $R^4$ and $R^5$ each independently represents preferably a hydrogen atom or aliphatic group, and further preferably a hydrogen atom, alkyl group or substituted alkyl group, and most preferably a hydrogen atom, an alkyl group having 1 to 18 carbon atoms or a substituted alkyl group having 1 to 18 carbon atoms.

In the above-described formula (I), $B^1$ represents $=C(R^6)-$ or $=N-$, and $B^2$ represents $-C(R^7)=$ or $-N=$. It is preferable that $B^1$ and $B^2$ do not simultaneously represent $-N=$, and it is more preferable that $B^1$ represents $=C(R^6)-$ and $B^2$ represents $-C(R^7)=$.

In the general formula (I), $R^2$, $R^3$, $R^6$ and $R^7$ each independently represents a hydrogen atom, halogen atom, aliphatic group, aromatic group, heterocyclic group, cyano group, $-OR^{51}$, $-SR^{52}$, $-CO_2R^{53}$, $-OCOR^{54}$, $-NR^{55}R^{56}$, $-CONR^{57}R^{58}$, $-SO_2R^{59}$, $-SO_2NR^{60}R^{61}$, $-NR^{62}CONR^{63}R^{64}$, $-NR^{65}CO_2R^{66}$, $-COR^{67}$, $-NR^{68}COR^{69}$ or $-NR^{70}SO_2R^{71}$, and $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$, and $R^{71}$ each independently represents a hydrogen atom, aliphatic group or aromatic group.

$R^2$ and $R^7$ each independently represents, among the above-mentioned moieties, preferably a hydrogen atom, halogen atom, aliphatic group, $-OR^{51}$, $-NR^{62}CONR^{63}R^{64}$, $-NR^{65}CO_2R^{66}$, $-NR^{68}COR^{69}$, or $-NR^{70}SO_2R^{71}$, further preferably a hydrogen atom, fluorine atom, chlorine atom, alkyl group, substituted alkyl group, $-NR^{62}CONR^{63}R^{64}$, or $-NR^{68}COR^{69}$, still further preferably a hydrogen atom, chlorine atom, alkyl group having 1 to 10 carbon atoms, or substituted alkyl group having 1 to 10 carbon atoms, and most preferably a hydrogen atom, alkyl group having 1 to 4 carbon atoms, or substituted alkyl group having 1 to 4 carbon atoms.

$R^3$ and $R^6$ each independently represents, among the above-mentioned moieties, preferably a hydrogen atom, halogen atom, or aliphatic group, further preferably a hydrogen atom, fluorine atom, chlorine atom, alkyl group, or substituted alkyl group, still further preferably a hydrogen atom, chlorine atom, alkyl group having 1 to 10 carbon atoms, or substituted alkyl group having 1 to 10 carbon atoms, and most preferably a hydrogen atom, alkyl group having 1 to 4 carbon atoms, or substituted alkyl group having 1 to 4 carbon atoms.

In the general formula (I), $R^2$ and $R^3$, $R^3$ and $R^4$, $R^4$ and $R^5$, $R^5$ and $R^6$, or $R^6$ and $R^7$ may bond with each other to form rings. As a combination to form rings, combinations of $R^3$ and $R^4$, $R^4$ and $R^5$, and $R^5$ and $R^6$ are preferable. A ring formed by mutual bonding of $R^2$ and $R^3$, or $R^6$ and $R^7$ is preferably a 5-member ring or 6-member ring. The ring is preferably an aromatic ring (for example, a benzene ring) or an unsaturated heterocyclic ring (for example, a pyridine ring, imidazole ring, thiazole ring, pyrimidine ring, pyrrole ring, or furan ring). A ring formed by mutual bonding of $R^3$ and $R^4$, or $R^5$ and $R^6$ is preferably a 5-member ring or 6-member ring. Examples of the ring include a tetrahydroquinoline ring and dihydroindole ring. A ring formed by mutual bonding of $R^4$ and $R^5$ is preferably a 5-member ring or 6-member ring. Examples of the ring include a pyrrolidine ring, piperidine ring and morpholine ring.

In the present specification, aliphatic group means an alkyl group, substituted alkyl group, alkenyl group, substituted alkenyl group, alkinyl group, substituted alkinyl group, aralkyl group or substituted aralkyl group.

The alkyl group may have branching, or may form a ring. The number of carbon atoms in the alkyl group is preferably from 1 to 20, and further preferably from 1 to 18.

An alkyl moiety of the substituted alkyl group is the same as in the above-mentioned alkyl group.

The alkenyl group may have branching, or may form a ring. The number of carbon atoms in the alkenyl group is preferably from 2 to 20, and further preferably from 2 to 18.

An alkenyl moiety of the substituted alkenyl group is the same as in the above-mentioned alkenyl group.

The alkinyl group may have branching, or may form a ring. The number of carbon atoms in the alkinyl group is preferably from 2 to 20, and further preferably from 2 to 18.

An alkinyl moiety of the substituted alkinyl group is the same as in the above-mentioned alkinyl group.

An alkyl moiety of the aralkyl group and substituted aralkyl group is the same as in the above-mentioned alkyl group. An aryl moiety of the aralkyl group and substituted aralkyl group is the same as in the following aryl group Examples of substituents on the substituted alkyl group, substituted alkenyl group, substituted alkinyl group and substituents on an alkyl moiety of the substituted aralkyl group include a halogen atom, cyano group, nitro group, heterocyclic group, $-OR^{111}$, $-SR^{112}$, $-CO_2R^{113}$, $-NR^{114}R^{115}$, $-CONR^{116}R^{117}$, $-SO_2R^{118}$, and $-SO_2NR^{119}R^{120}$. $R^{111}$, $R^{112}$, $R^{113}$, $R^{114}$, $R^{115}$, $R^{116}$, $R^{117}$, $R^{118}$, $R^{119}$ and $R^{120}$ each independently represents a hydrogen atom, aliphatic group or aromatic group.

Examples of substituents on an aryl moiety of the substituted aralkyl group are the same as the following examples of substituents on the substituted aryl group.

In the present specification, aromatic group means an aryl group or substituted aryl group. The aryl group is preferably a phenyl group or naphthyl group, and particularly preferably a phenyl group.

An aryl moiety of the substituted aryl group is the same as in the above-mentioned aryl group.

Examples of substituents on the substituted aryl group include a halogen atom, cyano group, nitro group, aliphatic group, heterocyclic group, $-OR^{121}$, $-SR^{122}$, $-CO_2R^{123}$, $-NR^{124}R^{125}$, $-CONR^{126}R^{127}$, $-SO_2R^{128}$, and $-SO_2NR^{129}R^{130}$. $R^{121}$, $R^{122}$, $R^{123}$, $R^{124}$, $R^{125}$, $R^{126}$, $R^{127}$, $R^{128}$, $R^{129}$ and $R^{130}$ each independently represents a hydrogen atom, aliphatic group or aromatic group.

In the present specification, the heterocyclic group includes both of groups having a saturated ring and groups having an unsaturated ring. The heterocyclic ring is preferably a 5-member or 6-member ring. Further, the heterocyclic ring may be condensed with an aliphatic ring, aromatic ring or other heterocyclic ring. The hetero atom in the heterocyclic ring includes B, N, O, S, Se and Te. Of these, the hetero atom is preferably N, O or S. A heterocyclic group in which a carbon atom, among atoms constituting the heterocyclic ring, has free atomic valency (monovalency) is preferable (a heterocyclic group is bonded at a carbon atom). Examples of the saturated heterocyclic ring include a pyrrolidine ring, morpholine ring, 2-bora-1,3-dioxorane ring and 1,3-thiazolidine ring. Examples of the unsaturated heterocyclic ring include an imidazole ring, thiazole ring, benzothiazole ring, benzooxazole ring, banzotriazole ring, benzoselenazole ring, pyridine ring, pyrimidine ring and quinoline ring.

The heterocyclic group may have a substituent. Examples of this substituent include a halogen atom, cyano group, nitro group, aliphatic group, aromatic group, heterocyclic group, $-OR^{131}$, $-SR^{132}$, $-CO_2R^{133}$, $-NR^{134}R^{135}$, $-CONR^{136}R^{137}$, $-SO_2R^{138}$, and $-SO_2NR^{139}R^{140}$. $R^{131}$, $R^{132}$, $R^{133}$, $R^{134}$, $R^{135}$, $R^{136}$, $R^{137}$, $R^{138}$, $R^{139}$, and $R^{140}$ each independently represents a hydrogen atom, aliphatic group or aromatic group.

In the above-mentioned general formula (I), X represents a residual group of a color coupler. A pigment represented by the general formula (I) is produced by reacting an oxide of a developing agent with a coupler, and X represents a group derived from the coupler. Herein, the coupler is a compound which can cause a coupling reaction with an oxide of a developing agent. More specific explanations thereof are described in "3.6, Kapura to Kanren Busshitsu " (Couplers and Related substances), pp. 204 to 222 in "Shashin Kogaku no Kiso-Ginen Shashin Hen" (Base of Photography Technology Silver Salt Photography Chapter) (edited by Nihon Shashin Gakkai (Japan Photography Institution)) (1979, issued by Corona K. K.). Here, the developing agent is a compound whose oxide can cause a coupling reaction with a coupler to form a cyan, magenta or yellow azomethine pigment, indoaniline pigment or the like. Examples include p-phenylenediamine derivatives, p-aminophenol derivatives and the like (preferably, p-phenylenediamine derivatives). More specific explanations thereof are described in "4.3, Kara Shashin no Genzo Shori" (Developing Treatment of Color Photography), pp. 345 to 354 in "Shashin Kogaku no Kiso-Ginen Shashin Hen" (Base of Photography Technology-Silver Salt Photography Chapter) (edited by Nihon Shashin Gakkai (Japan Photography Institution)) (1979, issued by Corona K. K.).

As the yellow coupler, examples include couplers represented by the formulae (I) and (II) described in U.S. Pat. Nos. 3,933,501, 4,022,620, 4,326,024, 4,401,752 and 4,248,961, Japanese Patent Application Publication (JP-B) No. 58-10739, GB Patent Nos. 1,425,020 and 1,476,760, U.S. Pat. Nos. 3,973,968, 4,314,023 and 4,511,649, EU Patent Nos. 249,473A and 502,424A, couplers represented by the formulae (1) and (2) in EU Patent No. 513,496A (particularly Y-28 described on page 18), couplers represented by the formula (1) described in claim 1 of EU Patent No. 568,037A, couplers represented by the general formula (1) described in U.S. Pat. No. 5,066,576, column 1, line 45 to 55, couplers represented by the general formula (1) described in JP-A No. 4-274425, paragraph 0008, couplers represented by the formula (1) described in EU Patent No.

498,381A1, p. 40, claim 1 (particularly D-35 described on page 18), couplers represented by the formula (Y) described in EU Patent No. 447,969A, p. 4 (particularly Y-1 (page 17) and Y-54 (page 41)) and couplers represented by the formulae (II) to (IV) described in U.S. Pat. No. 4,476,219, column 7, line. 36 to 58 (particularly II-17, 19 (column 17) and II-24 (column 19)).

As the magenta coupler, there are listed compounds described in U.S. Pat. Nos. 4,310,619 and 4,351,897, EU Patent No. 73,636, U.S. Pat. Nos. 3,061,432, 3,725,067, Research Disclosure Nos. 24220 (June 1984) and 24230 (June 1984), JP-A Nos. 60-33552, 60-43659, 61-72238, 60-35730, 55-118034 and 60-185951, U.S. Pat. Nos. 4,500, 630, 4,540,654 and 4,556,630, International publication WO 88/04795, JP-A Nos. 3-39737 (L-57 (page 11, lower right column), L-68 (page 12, lower right column), L-77 (page 13, lower right column), [A-4]-63 (page 134), [A-4]-73, -75 (page 139) described in EU Patent No. 456,257, M-4, -6 (page 26), M-7 (page 27) described in EU Patent No. 486, 965, M-458(page 19) described in EU Patent No. 486,959A, (M-1) described in JP-A No. 5-204106 (page 6), and M-22 described in JP-A No. 4-362631, paragraph 0237.

As the cyan coupler, there are listed compounds described in U.S. Pat. Nos. 4,052,212, 4,146,396, 4,228,233 and 4,296,200, EU Patent No. 73,636, and CX-1, 3, 4, 5, 11, 12, 14, and 15 (pages 14 to 16) described in JP-A No. 4-204843; C-7, 10 (page 35), 34, 35 (page 37), I-1, I-17 (pages 42 to 43) described in JP-A No. 4-43345; and couplers represented by the general formula (Ia) or (Ib) described in JP-A No. 6-67385, claim 1.

In addition, couplers described in JP-A Nos. 62-215227 (page 91) and 2-33144 (pages 3, 30) and EP 355,660A (pages 4, 5, 45, 47) are also useful.

Of compounds represented by the above-mentioned general formula (I), compounds represented by the following general formula (II) are particularly preferably used as the magenta dye.

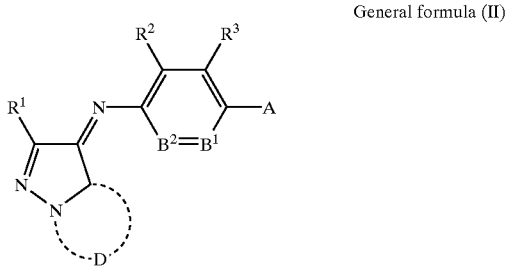

General formula (II)

In the general formula (II), $R^1$ represents a hydrogen atom, aliphatic group, aromatic group, heterocyclic group, cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$, or $-NR^{30}SO_2R^{31}$, and $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ each independently represents a hydrogen atom, aliphatic group or aromatic group. $R^2$, $R^3$, A, $B^1$ and $B^2$ are as defined in the general formula (I), and preferable ranges thereof are the same.

In the above-mentioned general formula (II), D represents a group of atoms forming a 5-member or 6-member nitrogen-containing heterocyclic ring which may be substituted by at least one of an aliphatic group, aromatic group, heterocyclic group, cyano group, $-OR^{81}$, $-SR^{82}$, $-CO_2R^{83}$, $-OCOR^{84}$, $-NR^{85}R^{86}$, $-CONR^{87}R^{88}$, $-SO_2R^{89}$, $-SO_2NR^{90}R^{91}$, $-NR^{92}CONR^{93}R^{94}$, $-NR^{95}CO_2R^{96}$, $-COR^{97}$, $-NR^{98}COR^{99}$, or $-NR^{100}SO_2R^{101}$, and this heterocyclic ring may further form a condensed ring with other ring. Here, $R^{81}$, $R^{82}$, $R^{83}$, $R^{84}$, $R^{85}$, $R^{86}$, $R^{87}$, $R^{88}$, $R^{89}$, $R^{90}$, $R^{91}$, $R^{92}$, $R^{93}$, $R^{94}$, $R^{95}$, $R^{96}$, $R^{97}$, $R^{98}$, $R^{99}$, $R^{100}$, and $R^{101}$ each independently represents a hydrogen atom, aliphatic group or aromatic group.

Of compounds represented by the general formula (II), those in which A is $-NR^4R^5$ are further preferable.

Next, the general formula (II) will be described in further in detail. $R^1$ represents, of the above-mentioned groups, preferably a hydrogen atom, aliphatic group, aromatic group, $-OR^{11}$, $-SR^{12}$, $-NR^{15}R^{16}$, $-SO_2R^{19}$, $-NR^{22}CONR^{23}R^{24}$, $-NR^{25}CO_2R^{26}$, $-NR^{28}COR^{29}$, or $-NR^{30}SO_2R^{31}$, more preferably a hydrogen atom, aliphatic group, aromatic group, $-OR^{11}$, or $-NR^{15}R^{16}$, still more preferably a hydrogen atom, alkyl group, substituted alkyl group, aryl group, substituted aryl group, alkoxy group, substituted alkoxy group, phenoxy group, substituted phenoxy group, dialkylamino group, or substituted dialkylamino group, further preferably a hydrogen atom, alkyl group having 1 to 10 carbon atoms, substituted alkyl group having 1 to 10 carbon atoms, aryl group having 6 to 10 carbon atoms or substituted aryl group having 6 to 10 carbon atoms, and most preferably a hydrogen atom, alkyl group having 1 to 6 carbon atoms, or substituted alkyl group having 1 to 6 carbon atoms.

D preferably forms a 5-member nitrogen-containing heterocyclic ring, and examples of the 5-member nitrogen-containing heterocyclic ring include an imidazole ring, triazole ring and tetrazole ring.

Of compounds represented by the above-mentioned general formula (II), pyrazolotriazoleazomethine compounds represented by the following general formula (III) are preferable.

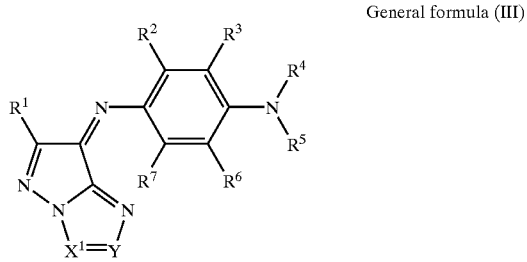

General formula (III)

In this formula, $R^1$, $R^2$, $R^3$, $R^4$, $R^5$, $R^6$ and $R^7$ have the same definitions as in the above-mentioned general formula (II). $X^1$ and Y each independently represents $-C(R^8)=$ or $-N=$, $R^8$ represents a hydrogen atom, aliphatic group or aromatic group, one of $X^1$ and Y is necessarily $-N=$, and $X^1$ and Y do not simultaneously represent $-N=$.

Here, $R^8$ represents preferably a hydrogen atom, alkyl group, substituted alkyl group, aryl group, or substituted aryl group, further preferably a hydrogen atom, alkyl group having 1 to 150 carbon atoms, or substituted aryl group having 6 to 150 carbon atoms, and most preferably an alkyl group having 1 to 100 carbon atoms, or substituted aryl group having 6 to 100 carbon atoms.

Of compounds represented by the above-mentioned general formula (III), pyrazolotriazoleazomethine compounds in which X represents $-N=$, and Y represents $-C(R^8)=$ are more preferable.

Exemplified compounds (M-1 to 16) of the pyrazolotriazoleazomethine compound represented by the general formula (II) are listed below.

M-1
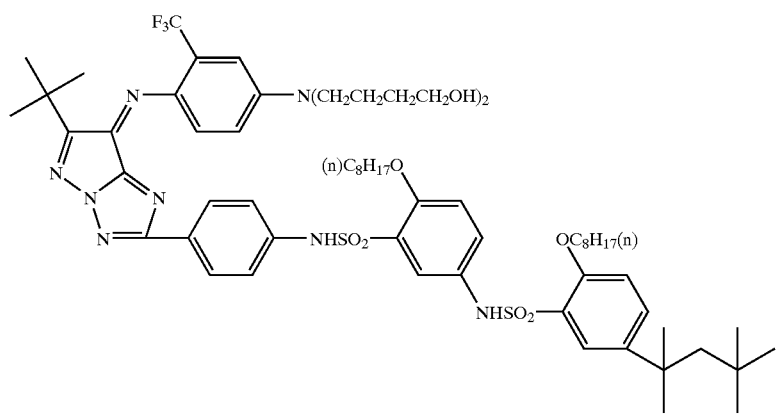
M-2
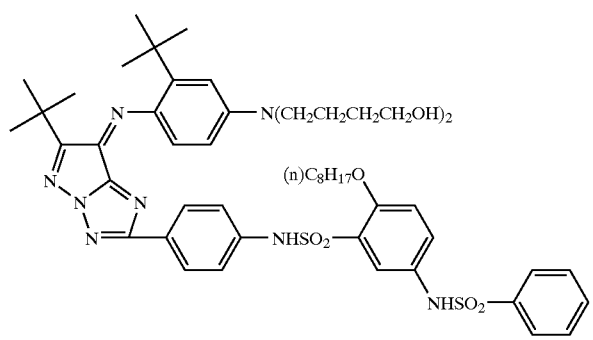
M-3
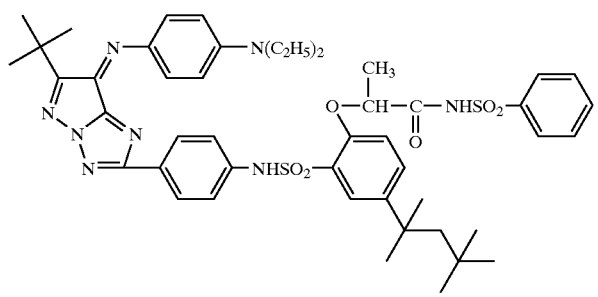
M-4
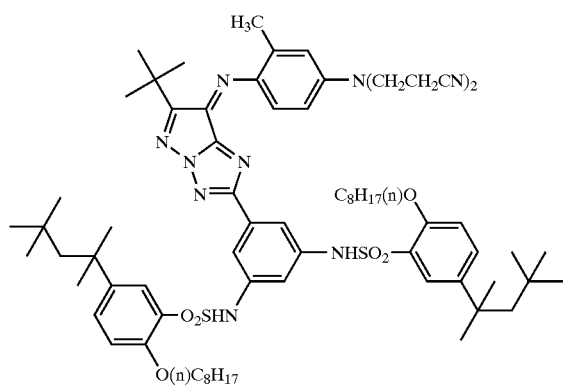
M-5
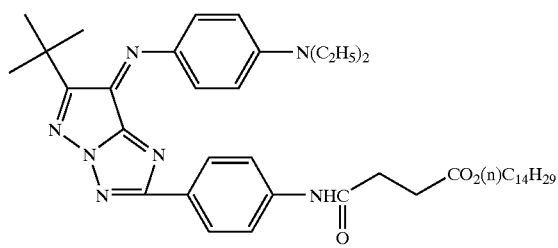
M-6
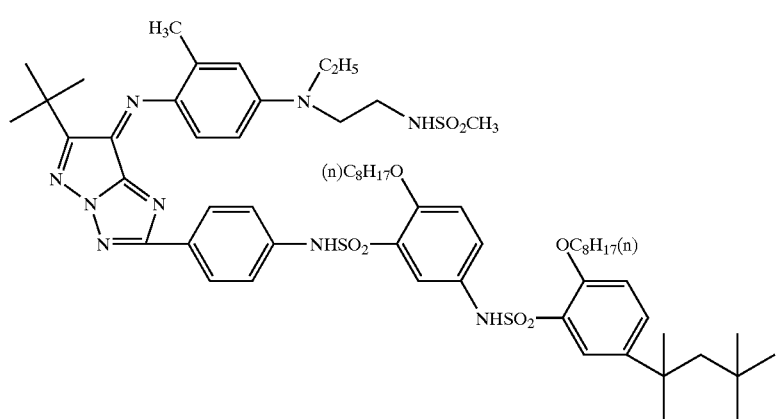

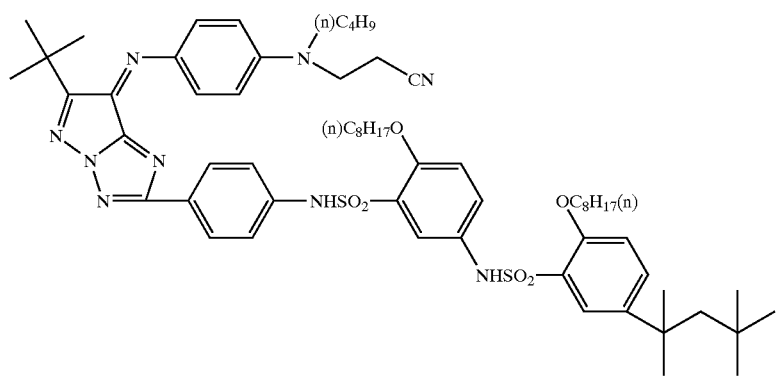
M-7
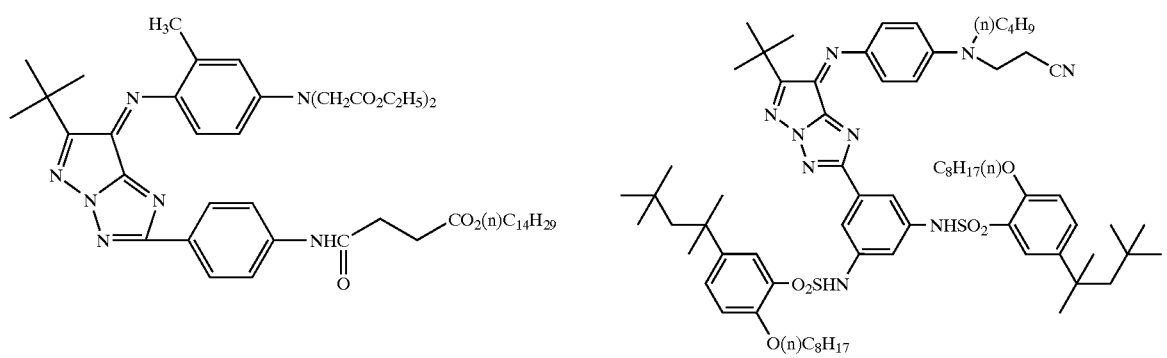
M-8
M-9
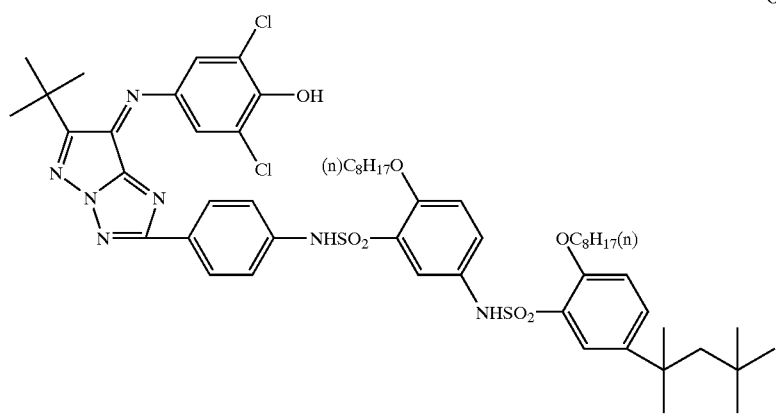
M-10
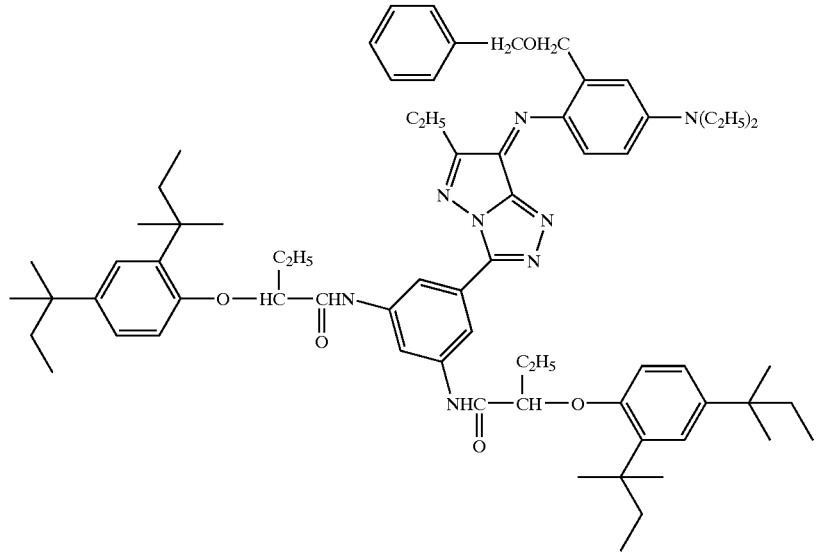
M-11

-continued
M-12
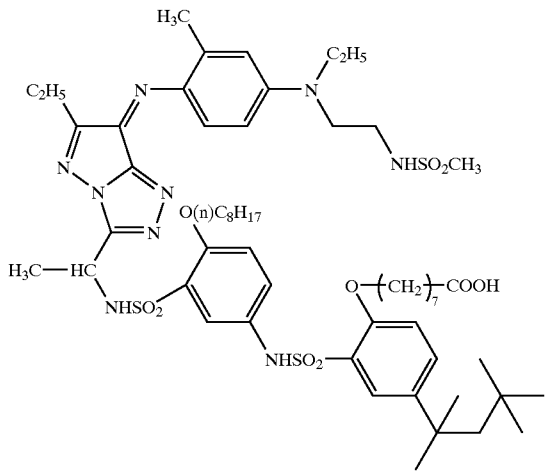
M-13
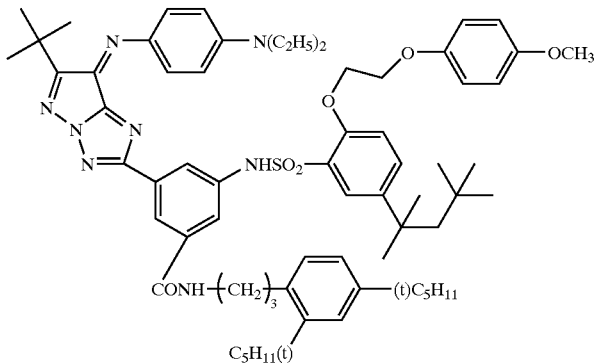
M-14
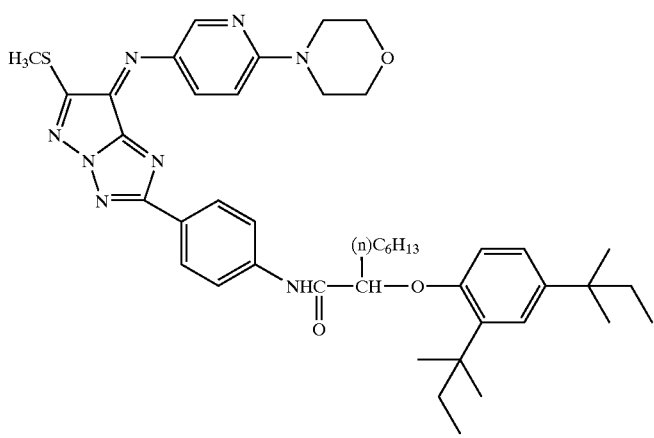
M-15
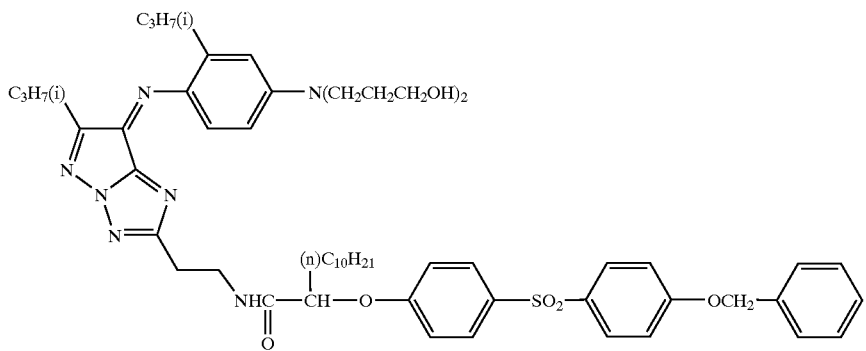
M-16
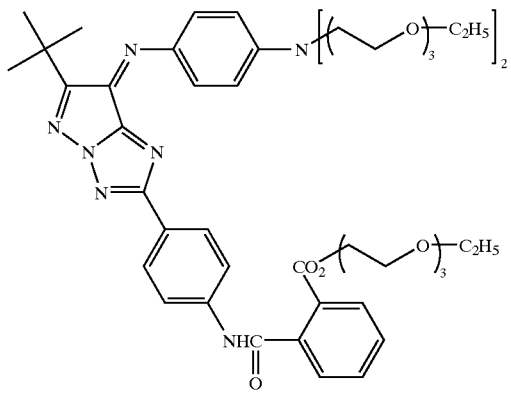

Examples of compounds usable in the present invention include, but are not limited to, exemplified compounds described in Japanese Patent Application No. 11-365189.

The pigment represented by the general formula (II) can be synthesized, for example, by referring to methods described in JP-A No. 4-126772, Japanese Patent Application Publication (JP-B) No. 7-94180 and Japanese Patent Application No. 11-365187.

As the cyan dye, pyrrolotriazoleazomethine compounds represented by the following general formulae (IV-1) to (IV-4) are particularly preferably used.

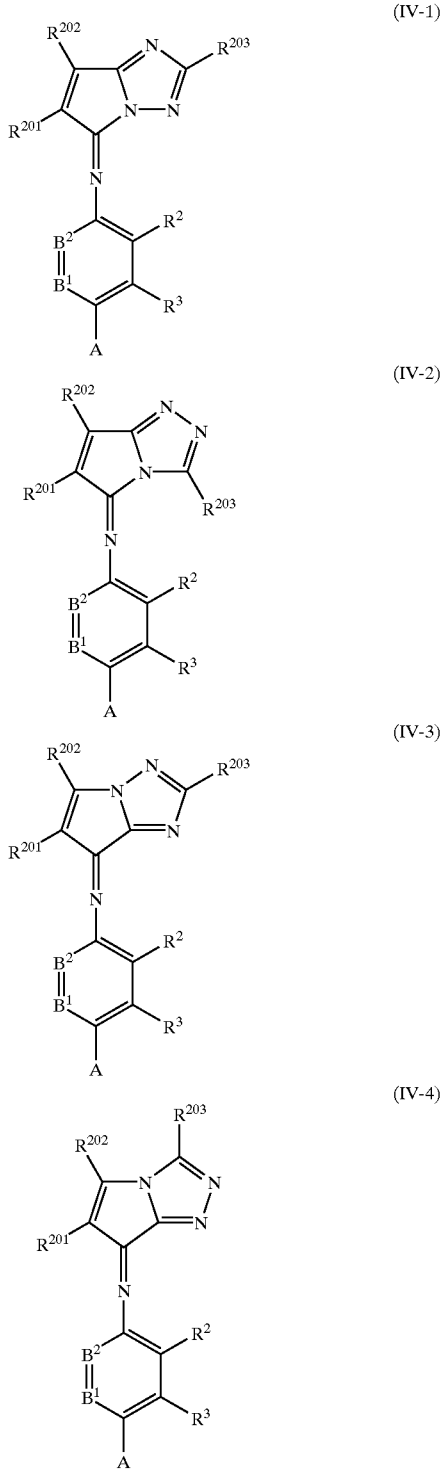

In the general formulae (IV-1) to (IV-4), A, $R^2$, $R^3$, $B^1$ and $B^2$ have the same definitions as in the general formula (I), and preferable ranges thereof are the same. $R^{201}$, $R^{202}$ and $R^{203}$ each independently has the same definition as $R^1$ in the general formula (II). $R^{201}$ and $R^{202}$ may bond mutually to form a ring structure.

Further, pyrrolotriazoleazomethine compounds represented by the general formulae (IV-1) to (IV-4) in which $R^{201}$ is an electron attractive group having Hammett substituent constant $\sigma_p$ value of 0.30 or more manifest sharp absorption and are more preferable. Pyrrolotriazoleazomethine compounds in which the sum of Hammett substituent constant $\sigma_p$ values of $R^{201}$ and $R^{202}$ is 0.70 or more manifest excellent hue as cyan color, and are further preferable.

Further detailed explanations will be made on hue. Pyrrolotriazoleazomethine compounds represented by the general formulae (IV-1) to (IV-4) manifest various hues depending on combination of $R^{201}$, $R^{202}$, $R^{203}$ and $R^2$, $R^3$, A, $B^1$ and $B^2$. Pyrrolotriazoleazomethine compounds represented by the general formulae (IV-1) to (IV-4) in which $R^{210}$ is a substituent having electron attractive property manifest more sharp absorption wave form and are preferable as compared with compounds in which $R^{201}$ is not an electron attractive substituent. When the electron attractive property is higher, the absorption wave form is more sharp. In this point, it is more preferable that $R^{201}$ is an electron attractive group having a Hammett substituent constant $\sigma_p$ value of 0.30 or more than that $R^{201}$ is an alkyl group or aryl group. Further, an electron attractive group having a Hammett substituent constant $\sigma_p$ value of 0.45 or more is more preferable, and the same having a Hammett substituent constant $\sigma_p$ value of 0.60 or more is most preferable.

The above-mentioned pyrrolotriazoleazomethine compound can be used as a magenta pigment or cyan pigment. It is more preferable to use this compound as a cyan pigment. Further, pyrrolotriazoleazomethine compounds represented by the general formulae (IV-1) to (IV-4) can also be used as a magenta pigment. For use of pyrrolotriazoleazomethine compounds represented by the general formulae (IV-1) to (IV-4) as a cyan pigment, it is preferable that the sum of Hammett substituent constant $\sigma_p$ values of $R^{201}$ and $R^{202}$ is 0.70 or more. When this sum is less than 0.70, the absorption maximum wavelength is short for a cyan pigment, undesirably. Among others, those in which $R^{202}$ has a Hammett substituent constant $\sigma_p$ value of 0.30 or more are preferable. The sum of Hammett substituent constant $\sigma_p$ values of $R^{201}$ and $R^{202}$ is preferably 2.0 or less.

As the electron attractive group having a Hammett substituent constant $\sigma_p$ value of 0.30 or more, there are listed acyl groups, acyloxy groups, carbamoyl groups, alkoxycarbonyl groups, aryloxycarbonyl groups, cyano groups, nitro groups, alkylsulfinyl groups, arylsulfinyl groups, alkylsulfonyl groups, arylsulfonyl groups, sulfamoyl groups, halogenated alkyl groups, halogenated alkoxy groups, halogenated aryloxy groups, halogenated alkylthio groups, aryl groups substituted with two or more electron attractive groups having a $\sigma_p$ value of 0.15 or more, and heterocyclic rings. More specifically, there are listed acyl groups (for example, acetyl, 3-phenylpropanoyl), acyloxy groups (for example, acetoxy), canbamoyl groups (for example, N-ethylcarbamoyl, N,N-dibutylcarbamoyl, N-(2-dodecyloxyethyl)carbamoyl, N-methyl-N-dodecylcarbamoyl), alkoxycarbonyl groups (for example, methoxycarbonyl, butyloxycarbonyl, dodecyloxycarbonyl, octadecyloxycarbonyl), aryloxycarbonyl groups (for example, phenoxycarbonyl), cyano groups, nitro groups, alkylsulfinyl groups (for example, 3-phenoxypropylsulfinyl), arylsulfinyl groups (for example, 3-pentadecylphenylsulfinyl), alkylsulfonyl groups (for example, methanesulfonyl, octanesulfonyl), arylsulfonyl groups (for example, benzenesulfonyl), sulfamoyl groups (for example, N-ethylsulfamoyl, N,N-dipropylsulfamoyl), halogenated alkyl groups (for example, trifluoromethyl, heptafluoropropyl), halogenated alkoxy groups (for example, trifluoromethyloxy), halogenated aryloxy groups (for example, pentafluorophenyloxy), halogenated alkylthio groups (for example, difluoromethylthio), aryl groups substituted with two or more electron attractive groups having a $\sigma_p$ value of 0.15 or more (for example, 2,4-dinitrophenyl, 2,4,6-trichlorophenyl, pentachlorophenyl), and heterocyclic rings (for example, 2-benzooxazolyl, 2-benzothiazolyl, 1-phenyl-2-benzimidazolyl, 5-chloro-1-tetrazolyl, 1-pyrrolyl).

As the electron attractive group having a Hammett substituent constant $\sigma_p$ value of 0.45 or more, there are listed acyl groups (for example, acetyl, 3-phenylpropanoyl), alkoxycarbonyl groups (for example, methoxycarbonyl), aryloxycarbonyl groups (for example, m-chlorophenoxycarbonyl), cyano group, nitro group, alkylsulfinyl groups (for example, n-propylsulfinyl), arylsulfinyl groups (for example, phenylsulfinyl), alkylsulfonyl groups (for example, methanesulfonyl and n-octanesulfonyl), arylsulfonyl groups (for example, benzenesulfonyl), sulfamoyl groups (for example, N-ethylsulfamoyl and N,N-dimethylsulfamoyl), and halogenated alkyl groups (for example, trifluoromethyl). As the electron attractive group having a Hammett substituent constant $\sigma_p$ value of 0.60 or more, examples include a cyano group (0.66), nitro group (0.78) and methanesulfonyl group (0.72).

As the combination in which the sum of $\sigma_p$ values of $R^{201}$ and $R^{202}$ is 0.70 or more, combinations in which $R^{201}$ is selected from cyano groups, alkoxycarbonyl groups, alkylsulfonyl groups, arylsulfonyl groups and halogenated alkyl groups, and $R^{202}$ is selected from acyl groups, acyloxy groups, carbamoyl groups, alkoxycarbonyl groups, aryloxycarbonyl groups, cyano group, alkylsulfonyl groups, arylsulfonyl groups, sulfamoyl groups and halogenated alkyl groups are preferable.

The pyrrolotriazoleazomethine compound used in the present invention has a preferable structure is selected from compounds represented by the following general formula (IV-1a), in which $R^2$ is a hydrogen atom, alkyl group having 1 to 4 carbon atoms, substituted alkyl group having 1 to 4 carbon atoms, alkoxy group having 1 to 4 carbon atoms, halogen atom (fluorine, chlorine, or bromine), acylamino group having 1 to 5 carbon atoms, aminocarbonylamino group having 1 to 5 carbon atoms or alkoxycarbonylamino group having 2 to 5 carbon atoms; $R^4$ and $R^5$ each independently is a hydrogen atom, alkyl group having 1 to 18 carbon atoms or substituted alkyl group having 1 to 18 carbon atoms; $R^{201}$ and $R^{202}$ each independently represents an electron attractive group having a Hammett substituent constant $\sigma_p$ value of 0.30 or more, and $R^{203}$ is an alkyl group having 1 to 18 carbon atoms, substituted alkyl group having 1 to 18 carbon atoms, or substituted or unsubstituted aryl group having 6 to 20 carbon atoms. When used as a cyan pigment, those of the above-mentioned groups in which the sum of Hammett substituent constant $\sigma_p$ values of $R^{201}$ and $R^{202}$ is 0.70 or more are preferable, and those in which the sum of $\sigma_p$ values is 1.00 or more are further preferable. The pyrrolotriazoleazomethine compound used in the present invention has a most preferable structure selected from compounds represented by the general formula (IV-1a) in which $R^2$ is a hydrogen atom or methyl group; $R^4$ and $R^5$ each independently is an alkyl group having 1 to 5 carbon atoms; $R^{201}$ is a cyano group; $R^{202}$ is an alkoxycarbonyl group; and $R^{203}$ is an aryl group.

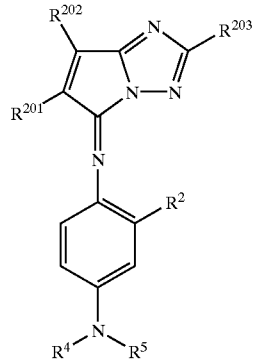

(IV-1a)

The Hammett substituent constant used in the present specification is described in Japanese Patent Application No. 11-365188, and the $\sigma_p$ value in the present invention is also as defined in the same.

Exemplified compounds (C-1 to 9) of the pyrrolotriazoleazomethine compound used in the present invention will be listed only for illustrating the present invention in detail; however, these compounds do not limit the scope of the present invention.

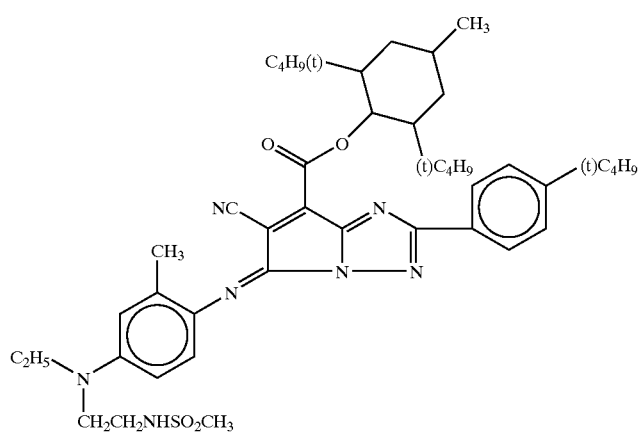

C-1

-continued
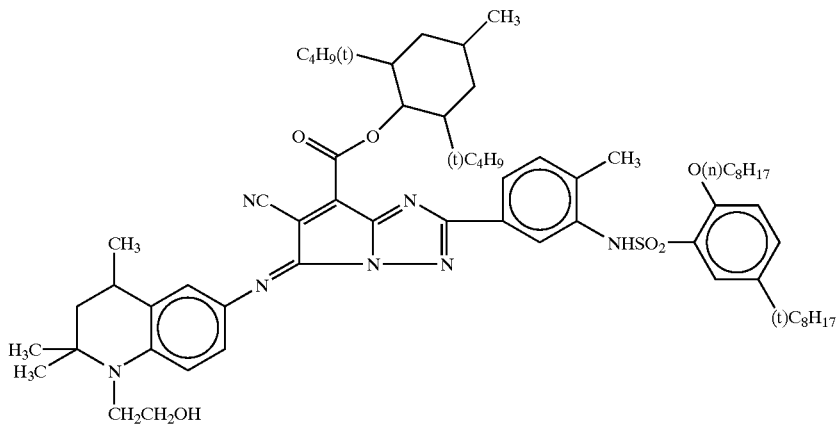
C-2
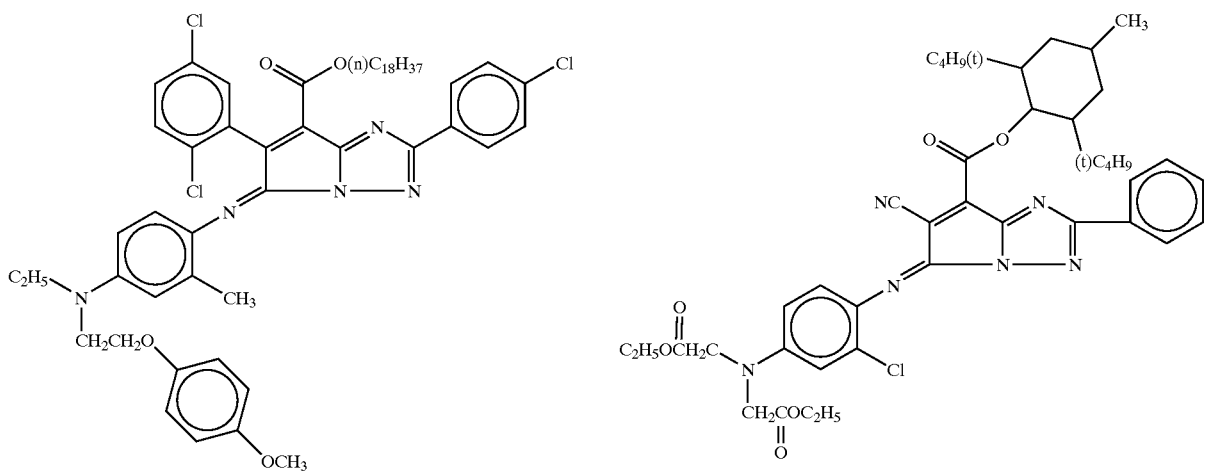
C-3
C-4
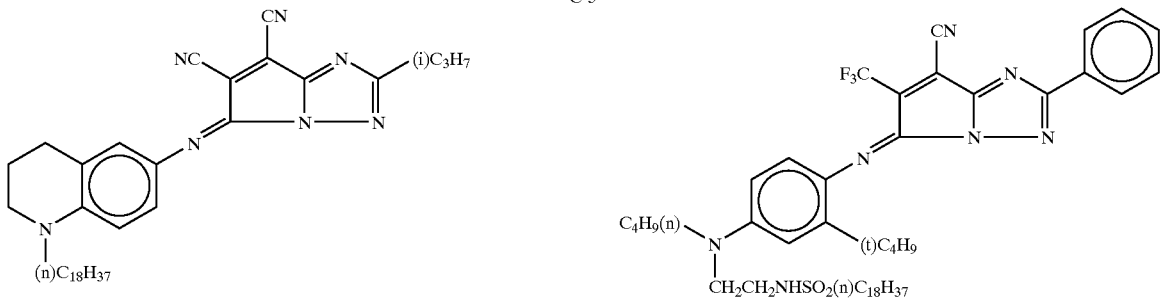
C-5
C-6
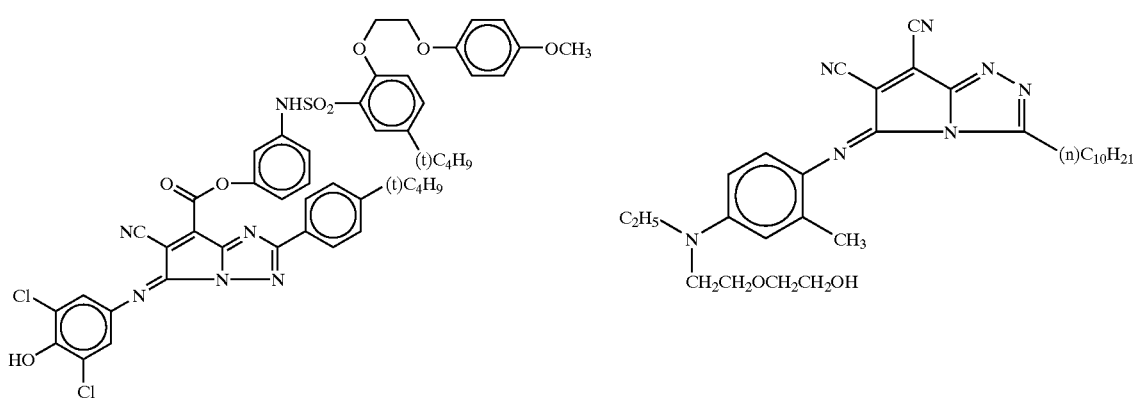
C-7
C-8

C-9

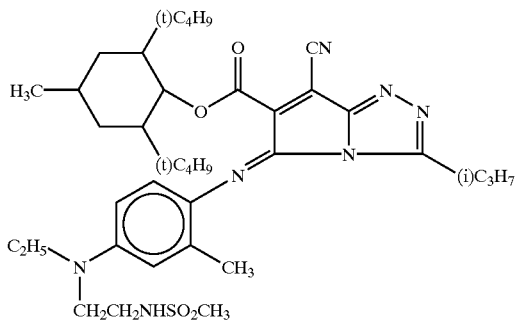

As compounds usable in the present invention, exemplified compounds described in Japanese Patent Application No. 11-365188 are further listed; however, these compounds do not limit the scope of the present invention.

The pyrrolotriazoleazomethine pigment represented by the general formulae (IV-1) to (IV-4) can be synthesized referring to methods described in JP-A Nos. 5-177959, 9-292679, 10-62926, and Japanese Patent Application No. 11-365188.

-Nonionic Oil-Soluble Polymer-

In the present invention, a nonionic oil-soluble polymer (hereinafter, the nonionic oil-soluble polymer may be referred to only as "oil-soluble polymer") is an oil-soluble polymer which does not have an ionic group. The oil-soluble polymer includes, for example, a vinyl polymer and a condensed system polymer (polyurethane, polyester, polyamide, polyurea, polycarbonate). The oil-soluble polymer having a dispersibility group is more preferable from the point of manufacturing easiness, dispersion stability, or the like of coloring particulates (however, the dispersibility group is not essential). The dispersibility group includes nonionic dispersibility groups such as a polyethylene oxy group, polyvinyl alcohol, and the like.

A polyvinyl polymer which is applicable to the above oil-soluble polymer includes, for example, polymers which are formed by polymerizing the following vinyl monomers. Namely, there are listed acrylates and methacrylates (an ester group may be an alkyl group or aryl group that has a substituent; for example, a methyl group, ethyl group, n-propyl group, isopropyl group, n-butyl group, sec-butyl group, tert-butyl group, hexyl group, 2-ethylhexyl group, tert-octyl group, 2-chloroethyl group, cyanoethyl group, 2-acetoxyethyl group, tetrahydrofurfuryl group, 5-hydroxypentyl group, cyclohexyl group, benzyl group, hydroxyethyl group, 3-methoxybutyl group, 2-(2-methoxyethoxy)ethyl group, 2,2,2-tetrafluoroethyl group, 1H, 1H, 2H, 2H-perfluorodecyl group, phenyl group, 2,4,5-tetramethylpheyl group, 4-chlorophenyl group or the like);

vinyl esters: specifically, vinyl aliphatic carboxylates which may have a substituent (for example, vinyl acetate, vinyl propionate, vinyl butyrate, vinyl isobutyrate, vinyl caproate, vinylchloro acetate and the like), vinyl aromatic carboxylates which may have a substituent (for example, vinyl benzoate, vinyl 4-methylbenzoate, vinyl salicylate and the like);

acrylamides: specifically, acrylamide, N-monosubstituted acrylamides, N-disubstituted acrylamides (a substituent is an alkyl group, aryl group or silyl group which may have a substituent; and for example, a methyl group, n-propyl group, isopropyl group, n-butyl group, tert-butyl group, tert-octyl group, cyclohexyl group, benzyl group, hydroxymethyl group, alkoxymethyl group, phenyl group, 2,4,5-tetramethylphenyl group, 4-chlorophenyl group, trimethylsilyl group and the like);

methacrylamides, specifically, methacrylamide, N-monosubstituted methacrylamides, N-disubstituted methacrylamides (a substituent is an alkyl group, aryl group or silyl group which may have a substituent; for example, a methyl group, n-propyl group, isopropyl group, n-butyl group, tert-butyl group, tert-octyl group, cyclohexyl group, benzyl group, hydroxymethyl group, alkoxymethyl group, phenyl group, 2,4,5-tetramethylphenyl group, 4-chlorophenyl group, trimethylsilyl group and the like);

olefins (for example, ethylene, propylene, 1-pentene, vinyl chloride, vinylidene chloride, isoprene, chloroprene, butadiene and the like), styrenes (for example, styrene, methylstyrene, isopropylsytrene, methoxystyrene, acetoxystyrene, chlorostyrene and the like), vinyl ethers (for example, methyl vinyl ether, butyl vinyl ether, hexyl vinyl ether, methoxyethyl vinyl ether and the like); and other compounds.

As the other vinyl monomer, examples include listed crotonate esters, itaconate esters, maleate diesters, fumarate diesters, methyl vinyl ketone, phenyl vinyl ketone, methoxyethyl vinyl ketone, N-vinyloxazolidone, N-vinylpyrrolidone, methylenemalonnitrile, diphenyl-2-acryloyloxyethyl phosphate, dipheyl-2-methacryloyloxyethyl phosphate, dibutyl-2-acryloyloxyethyl phosphate, dioctyl-2-methacryloyloxyethyl phosphate and the like.

Further, a monomer containing a nonionic dispersibility group includes, for example, ester of polyethylene glycol monoalkyl ether and carboxylic acid monomer, ester of polyethylene glycol monoalkyl ether and sulfonic acid monomer, ester of polyethylene glycol monoalkyl ether and phosphoric acid monomer, urethane containing a vinyl group which is formed by polyethylene glycol monoalkyl ether and monomer containing an isocyanate group, a macromonomer containing a polyvinyl alcohol structure.

The number of repetitions of an ethyleneoxy portion of the above polyethylene glycol monoalkyl ether is preferably 8 to 50, and more preferably 10 to 30. An alkyl group of the above polyethylene glycol monoalkyl ether has preferably 1 to 20 carbon atoms, and more preferably 1 to 12 carbon atoms.

The polyurethane which is applicable to the above oil-soluble polymer includes, for example, polyurethanes in which diol compounds and diisocyanate compounds, which are described below, are combined and synthesized through polyaddition reactions.

Examples of the above-mentioned diol compound include ethylene glycol, 1,2-propanediol, 1,3-propanediol, 1,2-butanediol, 1,3-butanediol, 2,3-butanediol, 2,2-dimehtyl-1,3-propanediol, 1,2-pentanediol, 1,4-pentanediol, 1,5-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, 2-methyl-2,4-pentanediol, 2,2-diethyl-1,3-propanediol, 2,4-dimethyl-2,4-pentanediol, 1,7-heptanediol, 2-methyl-2-propyl-1,3-propanediol, 2,5-dimethyl-2,-hexanediol, 2-ethyl-1,3-hexanediol, 1,2-octanediol, 1,8-octanediol, 2,2,4-trimethyl-1,3-pentanediol, 1,4-cyclohexanedimethanol, hydroquinone, diethylene glycol, triethylene glycol, dipropylene glycol, tripropylene glycol, polyethylene glycols (average molecular weight=200, 300, 400, 600, 1000, 1500, 4000), polypropylene glycols (average molecular weight= 200, 400, 1000), polyester polyols, 4,4'-dihydroxy-diphenyl-2,2-propane, 4,4'-dihydroxyphenylsulfonic acid, and the like.

As the above-mentioned diisocyanate compound, examples include methylene diisocyanate, ethylene diisocyanate, isophorone diisocyanate, hexamethylene diisocyanate, 1,4-cyclohexane diisocyanate, 2,4-toluene diisocyanate, 2,6-toluene diisocyanate, 1,3-xylylene diisocyanate, 1,5-naphthalene diisocyanate, m-phenylene diisocyanate, p-phenylene diisocyanate, 3,3'-dimethyl-4,4'-diphenylmethane diisocyanate, 3,3'-dimethylbiphenylene diisocyanate, 4,4'-biphenylene diisocyanate, dicyclohexylmethane diisocyanate, methylenebis(4-cyclohexyl isocyanate), and the like.

The diol compounds and diisocyanate compounds usable for synthesizing the polyurethane may be used each alone, or may be used in any combination of two or more depending on various objects (for example, control of glass transition temperature (Tg), solubility, compatibility with a dye, and stability of a dispersion).

As the polyester applicable to the oil-soluble polymer, there are listed, for example, polyesters synthesized by a polycondensation reaction of diol compounds with diisocyanate compounds, listed below in various combinations.

As the above-mentioned dicarboxylic acid compound, there are listed oxalic acid, malonic acid, succinic acid, glutaric acid, dimethylmaleic acid, adipic acid, pimelic acid, α,α-dimethylsuccinic acid, acetonedicarboxylic acid, sebacic acid, 1,9-nonanedicarboxylic acid, fumaric acid, maleic acid, itaconic acid, citraconic acid, phthalic acid, isophthalic acid, terephthalic acid, 2-butylterephthalic acid, tetrachloroterephthalic acid, acetylenedicarboxylic acid, poly(ethyleneterephthalate)dicarboxylic acid, 1,2-cyclohexanedicarboxylic acid, 1,4-cyclohexanedicarboxylic acid, ω-poly(ethyleneoxide)dicarboxylic acid, p-xylylenedicarboxylic acid and the like.

When the above dicarboxylic acid compound is subjected to polycondensation reaction with the diol compound, it is preferable to use the dicarboxylic acid compound in the form of dicarboxylic acid alkyl ester (e.g., dimethyl ester).

The above diol compound can use the compounds which are the same as the diols which are illustrated in the above polyurethane.

One of the diol compounds, one of the dicarboxylic acids, and one of the hydroxycarboxylic acid ester compounds, which are used for synthesis of the above polyester, may be used. Alternatively, two or more of the diol compounds, two or more of the dicarboxylic acids, and two or more of the hydroxycarboxylic acid ester compounds can be mixed and used in arbitrary proportions in accordance with various purposes (e.g., adjustment of glass transition temperature (Tg) of polymer or solubility of polymer, compatibility of polymer with a dye, stability of a dispersed product).

The polyamide which is applicable to the above oil-soluble polymer includes, for example, polyamides in which respective ones of diamine compounds listed below and the above dicarboxylic acid compounds are combined and synthesized through polycondensation.

The above-described diamine compounds include ethylenediamine, 1,3-propanediamine, 1,2-propanediamine, hexamethylenediamine, octamethylenediamine, o-phenylenediamine, m-phenylenediamine, p-phenylenediamine, piperazine, 2,5-dimethylpiperazine, 4,4'-diaminodiphenyl ether, 3,3'-diaminodiphenyl sulfone, xylylenediamine, and the like.

The above dicarboxylic acid compounds can use the compounds which are the same as the dicarboxylic acids which are illustrated in the above polyester. In particular, the dicarboxylic acid esters are preferably used.

The above-mentioned diamine compounds, dicarboxylic acids and aminocarboxylate compounds used in synthesis of the polyamide may be used each alone, or may be used in any combination of two or more depending on various objects (for example, control of glass transition temperature (Tg), solubility, compatibility with a dye, and stability of a dispersion).

As the polyurea applicable to the oil-soluble polymer, there are listed, for example, polyureas synthesized by a polyaddition reaction of a diamine compound with a diisocyanate compound, listed below in various combinations. Further, there are listed polyureas synthesized by a de-ammonia reaction of diamine compounds and urea.

As the above-mentioned diamine compound, there can be used the same compounds as the diamines exemplified for the above-mentioned polyamide.

As the above-mentioned diisocyanate compound, there can be used the same compounds as the diisocyanates exemplified for the above-mentioned polyurethane.

The above-mentioned diamine compounds, diisocyanate compounds and the like used in synthesis of the polyurea may be used each alone, or may be used in any combination of two or more depending on various objects (for example, control of glass transition temperature (Tg), solubility, compatibility with a dye, and stability of a dispersion).

As the polycarbonate applicable to the oil-soluble polymer, there are listed, for example, polycarbonates synthesized by reacting diol compounds listed below with phosgenes or carbonate derivatives (for example, aromatic esters such as diphenylcarbonate and the like).

As the above-mentioned diol compound, there can be used the same compounds as the diols exemplified for the above-mentioned polyurethane.

The raw materials such as the diol compound and the like used in synthesis of the polycarbonate may be used each alone, or may be used in any combination of two or more depending on various objects (for example, control of glass transition temperature (Tg), solubility, compatibility with a dye, and stability of a dispersion).

In the present invention, among the above illustrated polymers, the vinyl polymer is preferable as the above nonionic oil-soluble polymer.

Among the above oil-soluble polymers, concrete examples (P-1) to P-25)) of the vinyl polymer will be listed below. The ratio within a parenthesis means mass ratio. Note that the present invention is not limited to these concrete examples at all.

P-1) methyl methacrylate-ethyl acrylate copolymer (50:50)
P-2) methyl methacrylate-methyl acrylate copolymer (65:35)
P-3) butyl acrylate-styrene copolymer (50:50)
P-4) polyethyl methacrylate
P-5) poly n-butyl methacrylate
P-6) polyisobutyl methacrylate
P-7) polyisopropyl methacrylate
P-8) polymethyl chloroacrylate
P-9) poly(2-tert-butylphenyl acrylate)
P-10) poly(4-tert-butylphenyl acrylate)
P-11) n-butyl methacrylate-N-vinyl-2-pyrrolidone copolymer (90:10)
P-12) methyl methacrylate-vinyl chloride copolymer (70:30)
P-13) methyl methacrylate-styrene copolymer (50:50)
P-14) isobutyl methacrylate-butyl acrylate copolymer (55:45)
P-15) n-butyl methacrylate-methyl methacrylate-styrene copolymer (50:30:20)
P-16) vinyl acetate-acrylamide copolymer (85:15)
P-17) vinyl chloride-vinyl acetate copolymer (65:35)
P-18) n-butyl acrylate-methyl methacrylate-n-butyl methacrylate copolymer (35:35:30)
P-19) diacetone acrylamide-methyl methacrylate copolymer (50:50)
P-20) ethyl methacrylate-n-butyl acrylate copolymer (70:30)
P-21) methyl methacrylate-cyclohexyl acrylate copolymer (50:50)
P-22) n-butyl methacrylate-methoxy polyethylene glycol (n=4) monomethacrylate copolymer (75:25)
P-23) ethyl methacrylate-styrene-methoxy polyethylene glycol (n=9) monomethacrylate copolymer (65:10:25)
P-24) methyl methacrylate-benzyl methacrylate-methoxy polyethylene glycol (n=23) monomethacrylate copolymer (20:50:30)
P-25) n-butyl methacrylate-styrene-polypropylene glycol monomethacrylate (n=7)-methoxy polyethylene glycol (n=23) monomethacrylate copolymer (30:40:10:20)

Further, among the above oil-soluble polymers, concrete examples (P-26) to P-45)) of the above-mentioned condensed polymer are listed up in the form of ingredient monomers thereof. However, examples (P-41) to P-45)) are listed up in a polymer form. Ratios in following parentheses and n, x and y in examples (P-41) to P-45)) indicate ratios by mole percentage of respective components. Note that the oil-soluble polymer which is used in the present invention is not limited to the following concrete examples.

P-26) toluene diisocyanate/ethylene glycol/1,4-butanediol (50/15/35)
P-27) 4,4'-diphenylmethane diisocyanate/1,3-propanediol/polypropylene glycol (Mw=1000) (50/45/5)
P-28) toluene diisocyanate/hexamethylene diisocyanate/ethylene glycol/polyethylene glycol (Mw=600)/1,4-butanediol (40/10/20/10/20)
P-29) 1,5-naphthylene diisocyanate/hexamethylene diisocyanate/diethylene glycol/1,6-hexanediol (25/25/35/15)
P-30) terephthalic acid/isophthalic acid/cyclohexane dimethanol/1,4-butanediol/ethylene glycol (25/25/25/15/10)
P-31) terephthalic acid/isophthalic acid/4,4'-dihydroxydiphenyl-2,2-propane/tetraethylene glycol/ethylene glycol (30/20/20/15/15)
P-32) terephthalic acid/isophthalic acid/cyclohexane dimethanol/neopentyl glycol/diethylene glycol (20/30/25/15/10)
P-33) terephthalic acid/isophthalic acid/1,4-benzene dimethanol/diethylene glycol/neopentyl glycol (25/25/25/15/10)
P-34) hexamethylenediamine/adipic acid (50/50)
P-35) tetramethylenediamine/adipic acid (50/50)
P-36) hexamethylenediamine/sebacic acid (50/50)
P-37) N,N'-dimethylethylenediamine/adipic acid/cyclohexanedicarboxylic acid (50/20/30)
P-38) toluene diisocyanate/4,4'-diphenylmethane diisocyanate/hexamethylenediamine (30/20/50)
P-39) nonamethylenediamine/urea (50/50)
P-40) hexamethylenediamine/nonamethylenediamine/urea (25/25/50)

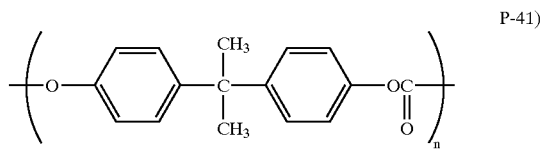

P-41)

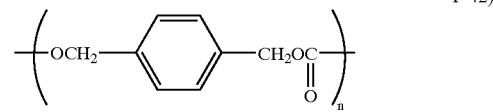

P-42)

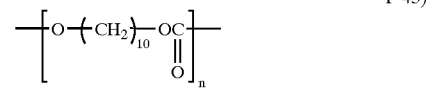

P-43)

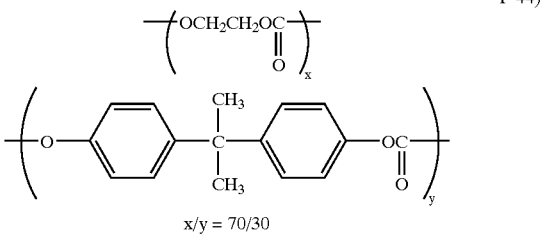

P-44)

x/y = 70/30

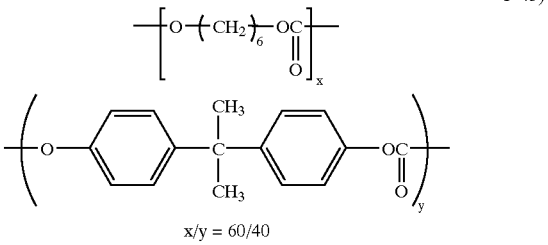

P-45)

x/y = 60/40

Regarding synthesis of the oil-soluble polymer, there are used methods described in "Kobunshi Jikkengaku (Polymer Experiment Study) Vol. 5 Jushukugo to Juhuka" (Polycondensation and Polyaddition)(Shu Kanbara ed., issued by Kyoritsu Shuppan K. K. (1980), "Poriesuteru Jushi Handobukku" (Polyester Resin Handbook) (Eiichiro Takiyama ed., issued by Nikkan Kogyo Shinbunsha (988), "Poriuretan Jushi Handobukku" (Polyurethane Resin Handbook)(Keiji Iwata ed., issued by Nikkan Kogyo Shinbunsha (987), "Koubnshi Gosei no Jikkenho" (Experiment Method of Polymer Synthesis)(Takayuki Otsu and Masaetsu Kinoshita co.ed., issued by Kagaku Dojin (1972), JP-B Nos. 33-1141, 37-7641, 39-5989, 40-27349, 42-5118, 42-24194, 45-10957, 48-25435, 49-36942, 52-81344, JP-A Nos. 56-88454, 6-340835 and the like.

The molecular weight (Mw) of the above oil-soluble polymer is usually 1000 to 200000, and preferably 2000 to 50000. When the above molecular weight exceeds 200000, there is a tendency in which solubility of the polymer to an organic solvent deteriorates, or in which, due to the increase in the viscosity of the organic solvent, it is difficult for the polymer to disperse.

-Hydrophobic Higher Boiling Point Organic Solvent-

In the present invention, the coloring particulate contains a hydrophobic high boiling point organic solvent. This hydrophobic high boiling point organic solvent is hydrophobic and has a boiling point of 150° C. or more. Here, the term "hydrophobic" means that solubility in distilled water at 25° C. is 3% or less. It is preferable that the boiling point of the hydrophobic high boiling point organic solvent is 170° C. or more. The dielectric constant of the hydrophobic high boiling point organic solvent is preferably from 3 to 12, and more preferably from 4 to 10. The "dielectric constant" herein referred to indicates relative dielectric constant relative to a vacuum at 25° C.

As the hydrophobic high boiling point organic solvent, compounds described in U.S. Pat. No. 2,322,027 can be used, and preferable examples thereof include, but are not limited to, hydrophobic high boiling point organic solvents derived from phosphates, fatty esters, phthalates, benzoates, phenols and amides.

As the hydrophobic high boiling point organic solvents, compounds represented by the following formulae [S-1]-[S-9] are particularly preferable.

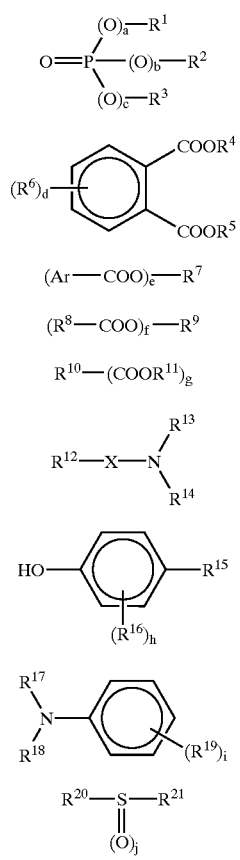

Formula [S-1]

Formula [S-2]

Formula [S-3]

Formula [S-4]

Formula [S-5]

Formula [S-6]

Formula [S-7]

Formula [S-8]

Formula [S-9]

In the formula [S-1], $R^1$, $R^2$ and $R^3$ each independently represents an aliphatic group or an aryl group. Symbols a, b, and c each independently represents 0 or 1.

In the formula [S-2], $R^4$ and $R^5$ each independently represents an aliphatic group or an aryl group.

$R^6$ is a halogen atom (the halogen atom is F, Cl, Br or I, which is the same as in the following), an alkyl group, an alkoxy group, an aryloxy group, an alkoxycarbonyl group, or an aryloxycarbonyl group.

Symbol d is an integer of 0 to 3, and when d is 2 or more, $R^6$s may be the same or different.

In the formula [S-3], Ar represents an aryl group, and symbol e is an integer of 1 to 6. $R^7$ represents a hydrocarbon group or a hydrocarbon group having an ether bond therein, which is having e valences.

In the formula [S-4], $R^8$ represents an alipahtic group, and symbol f is an integer of 1 to 6. $R^9$ represents a hydrocarbon group or a hydrocarbon group having an ether bond therein, which is having f valences.

In the formula [S-5], symbol g is an integer of 2 to 6. $R^{10}$ represents a hydrocarbon group (except any aryl group) having g valences. $R^{11}$ represents an aliphatic group or an aryl group.

In the formula [S-6], $R^{12}$, $R^{13}$ and $R^{14}$ each independently represents a hydrogen atom, an aliphatic group or an aryl group. X represents —CO— or $SO_2$—. $R^{12}$ and $R^{13}$, or $R^{13}$ and $R^{14}$ may be bonded to each other to form a ring.

In the formula [S-7], $R^{15}$ represents an aliphatic group, alkoxycarbonyl group, an aryloxycarbonyl group, an alkylsulfonyl group, an arylsulfonyl group, an aryl group or a cyano group.

$R^{16}$ represents a halogen atom, an aliphatic group, an aryl group, an alkoxy group or an aryloxy group.

Symbol h is an integer of 0 to 3. In the case that h is 2 or more, $R^{16}$s may be the same or different.

In the formula [S-8], $R^{17}$ and $R^{18}$ each independently represents an aliphatic group or an aryl group. $R^{19}$ is a halogen atom, an aliphatic group, an aryl group, an alkoxy group or an aryloxy group. Symbol i is an integer of 0 to 4. In the case that i is 2 or more, $R^{19}$s may be the same or different.

In the formula [S-9], $R^{20}$ and $R^{21}$ each independently represents an aliphatic group or an aryl group. Symbol j is 1 or 2.

When $R^1$ to $R^6$, $R^8$, $R^{11}$ to $R^{21}$ are aliphatic groups or groups containing an aliphatic group in the formulae [S-1] to [S-9], the aliphatic groups may be any one of straight chain, branched chain and cyclic forms, may contain an unsaturated bond, and may have a substituent. Examples of the substituent include a halogen atom, an aryl group, an alkoxy group, an aryloxy group, an alkoxycarbonyl group, a hydroxyl group, an acyloxy group and an epoxy group.

When $R^1$ to $R^6$, $R^8$, $R^{11}$ to $R^{21}$ are cyclic alipahtic groups, i.e., cycloalkyl groups, or groups containing a cycloalkyl group in the formulae [S-1] to [S-9], the cycloalkyl group may contain an unsaturated bond in its 3 to 8-membered ring or may have a substituent or a crosslinking group. Examples of the substituent include a halogen atom, an aliphatic group, a hydroxyl group, an acyl group, an aryl group, an alkoxy group, an epoxy group, and an alkyl group. Examples of the crosslinking group include a methylene group, an ethylene group, and an isopropylidene group.

When $R^1$ to $R^6$, $R^8$, $R^{11}$ to $R^{21}$ are aryl groups or groups containing an aryl group in the formulae [S-1] to [S-9], the aryl group may be substituted with a halogen atom, an aliphatic group, an aryl group, an alkoxy group, an aryloxy group, an alkoxycarbonyl group or the like.

When $R^7$, $R^9$ or $R^{10}$ is a hydrocarbon group in the formulae [S-3], [S-4] and [S-5], the hydrocarbon group may contain a cyclic structure (for example, a benzene ring, a cyclopentane ring or a cyclohexane ring), an unsaturated bond or a substituent. Examples of the substituent include a halogen atom, a hydroxyl group, an acyloxy group, an aryl group, an alkoxy group, an aryloxy group, and an epoxy group.

The following will describe particularly preferable hydrophobic high boiling point organic solvents in the present invention.

In the formula [S-1], $R^1$, $R^2$ and $R^3$ each represents an aliphatic group having 1-24 (preferably 4–18) carbon atoms (for example, n-butyl, 2-ethylhexyl, 3,3,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl, 4-methylcyclohexyl, or an aryl group having 6–24 (preferably 6–18) carbon atoms (for example, phenyl, cresyl, p-nonylphenyl, xylyl, cumenyl, p-methoxyphenyl and p-methoxycarbonylphenyl).

Symbols a, b and c each independently represents 0 or 1, and preferably a, b and c each represents 1.

In the formula [S-2], $R^4$ and $R^5$ each represents an aliphatic group having 1–24 (preferably 4–18) carbon atoms (for example, the same alkyl groups as described as $R^1$, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, and 1-methylcyclohexyl), or an aryl group having 6–24 (preferably 6–18) carbon atoms (for example, the same aryl groups as described as $R^1$, 4-t-butylphenyl, 4-t-octylphenyl, 1,3,5-trimethylphenyl, 2,4-di-t-butylphenyl, and 2,4-di-t-pentylphenyl).

$R^6$ represents a halogen atom (preferably Cl), an alkyl group having 1–18 carbon atoms (for example, methyl, isopropyl, t-butyl, and n-dodecyl), an alkoxy group having 1–18 carbon atoms (for example, methoxy, n-butoxy, n-octyloxy, methoxyethoxy, and benzyloxy), an aryloxy group having 6–18 carbon atoms (for example, phenoxy, p-tolyloxy, 4-methoxyphenoxy, 4-t-butylphenoxy), an alkoxycarbonyl group having 2–19 carbon atoms (for example, methoxycarbonyl, n-butoxycarbonyl and 2-ethylhexyloxycarbonyl), or an aryloxycarbonyl group having 6–25 carbon atoms.

Symbol d represents 0 or 1.

In the formula [S-3], Ar represents an aryl group having 6–24 (preferably 6–18) carbon atoms (for example, phenyl, 4-chlorophenyl, 4-methoxyphenyl, 1-naphthyl, 4-n-butoxyphenyl, and 1,3,5-trimethylphenyl), and e is an integer of 1–4 (preferably 1–3). $R^7$ represents a hydrocarbon having e valences and 2–24 (preferably 2–18) carbon atoms [for example, the same alkyl groups as described as $R^4$, a cycloalkyl group, an aryl group, —$(CH_2)_2$—, the following groups],

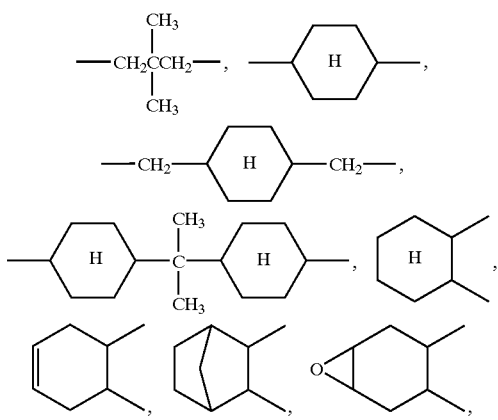

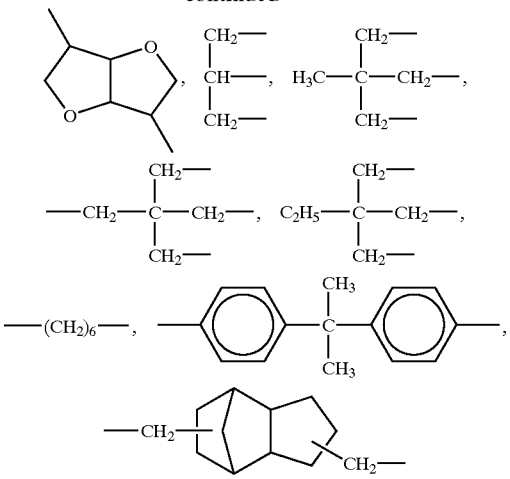

Alternatively, Ar represents a hydrocarbon group having e valences and 4–24 (preferably 4–18) carbon atoms, and having an ether bond therein [for example, —$CH_2CH_2OCH_2CH_2$—, —$CH_2CH_2(OCH_2CH_2)_3$—, —$CH_2CH_2CH_2OCH_2CH_2CH_2$—, and the following groups].

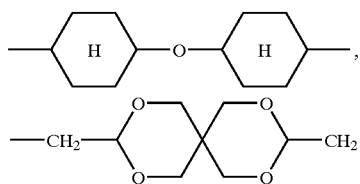

In the formula [S-4], $R^8$ represents an aliphatic group having 3–24 (preferably 3–17) carbon atoms (for example, n-propyl, 1-hydroxyethyl, 1-ethylpentyl, n-undecyl, pentadecyl, 8,9-epoxyheptadecyl, cyclopropyl, cyclohexyl, and 4-methylcyclohexyl), and f is an integer of 1–4 (preferably 1–3). $R^9$ represents a hydrocarbon group having f valences and 2–24 (preferably 2–18) carbon atoms, or a hydrocarbon group having f valences and 4–24 (preferably 4–18) carbon atoms and having an ether bond therein (for example, the same groups as described as $R^7$).

In the formula [S-5], g is 2–4 (preferably 2 or 3), and $R^{10}$ represnets a hydrocarbon group having g valences [for example, —$CH_2$—, —$(CH_2)_2$—, —$(CH_2)_4$—, —$(CH_2)_7$— and the following groups].

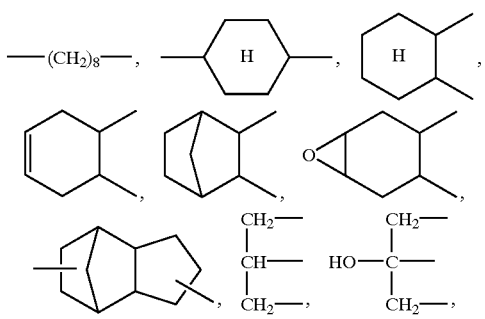

-continued

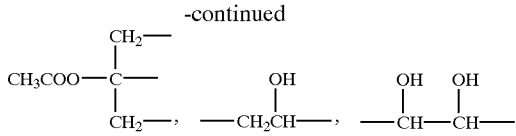

$R^{11}$ represents an aliphatic group having 1–24 (preferably 4–18) carbon atoms, or an aryl group having 6–24 (preferably 6–18) carbon atoms (for example, the same aliphatic groups and aryl groups as described as $R^4$).

In the formula [S-6], $R^{12}$ represents an aliphatic group having 1–20 carbon atoms [for example, n-propyl, 1-ethylpentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy)propyl, cyclohexyl, and 4-methylcyclohexyl], or an aryl group having 6–24 (preferably 6–18) carbon atoms (for example, the same aryl groups as described as the above-mentioned Ar).

$R^{13}$ and $R^{14}$ each represents an aliphatic group having 3–24 (preferably 3–18) carbon atoms (for example, isopropyl, n-butyl, n-hexyl, 2-ethylhexyl, n-dodecyl, cyclopentyl, and cyclopropyl), or an aryl group having 6–18 (preferably 6–15) carbon atoms (for example, phenyl, 1-naphthyl and p-tolyl).

$R^{13}$ and $R^{14}$ may be bonded to each other to form, together with N, a pyrrolidine ring, a piperidine ring, or a morpholine ring. $R^{12}$ and $R^{13}$ may be bonded to each other to form a pyrrolidone ring.

X represents —CO— or —SO$_2$—, and is preferably —CO—.

In the formula [S-7], $R^{15}$ represents an aliphatic group having 1–24 (preferably 3–18) carbon atoms (for example, methyl, isopropyl, t-butyl, t-pentyl, t-hexyl, t-octyl, 2-butyl, 2-hexyl, 2-octyl, 2-dodecy, 2-hexadecyl, t-pentadecyl, cyclopentyl and cyclohexyl), an alkoxycarbonyl group having 2–24 (preferably 5–17) carbon atoms (for example, n-butoxycarbonyl, 2-ethylhexyloxycarbonyl, and n-dodecyloxycarbonyl), an alkylsulfonyl group having 1–24 (preferably 3–18) carbon atoms (for example, n-butylsulfonyl and n-dodecylsulfonyl), an arylsulfonyl group having 6–30 (preferably 6–24) carbon atoms (for example, p-tolylsulfonyl, p-dodecylphenylsulfonyl and p-hexadecyloxyphenylsulfonyl), an aryl group having 6–32 (preferably 6–24) carbon atoms (for example, phenyl and p-tolyl), or a cyano group.

$R^{16}$ represents a halogen atom (preferably Cl), an alkyl group having 1–24 (preferably 3–18) carbon atoms (for example, the same alkyl groups as described as $R^{15}$), a cycloalkyl group having 5–17 carbon atoms (for example, cyclopentyl and cyclohexyl), an aryl group having 6–32 (preferably 6–24) carbon atoms (for example, phenyl and tolyl), an alkoxy group having 1–24 (preferably 1–18) carbon atoms (for example, methoxy, n-butoxy, 2-ethylhexyloxy, benzyloxy, n-dodecyloxy and n-hexadecyloxy), and an aryloxy group having 6–32 (preferably 6–24) carbon atoms (for example, phenoxy, p-t-butylphenoxy, p-t-octylphenoxy, m-pentadecylphenoxy and p-dodecyloxyphenoxy), and h is an integer of 1 or 2.

In the formula [S-8], $R^{17}$ and $R^{18}$ are the same as $R^{13}$ and $R^{14}$, and $R^{19}$ is the same as $R^{16}$.

In the formula [S-9], $R^{20}$ and $R^{21}$ are the same as $R^1$, $R^2$ and $R^3$, and j is 1 or 2 and is preferably 1.

The following will list up specific examples of the hydrophobic high boiling point organic solvent (S-1 to S-23 as compounds represented by the formula [S-1], S-24 to S-39 as compounds represented by the formula [S-2], S-40 to S-44 as compounds represented by the formula [S-3], S-45 to S-50 as compounds represented by the formula [S-4], S-51 to S-58 as compounds represented by the formula [S-5], S-59 to S-67 as compounds represented by the formula [S-6], S-68 to S-75 as compounds represented by the formula [S-7], S-76 to S-79 as compounds represented by the formula [S-8], and S-80 to S-81 as compounds represented by the formula [S-9]).

Compound Represented by the Formula [S-1]

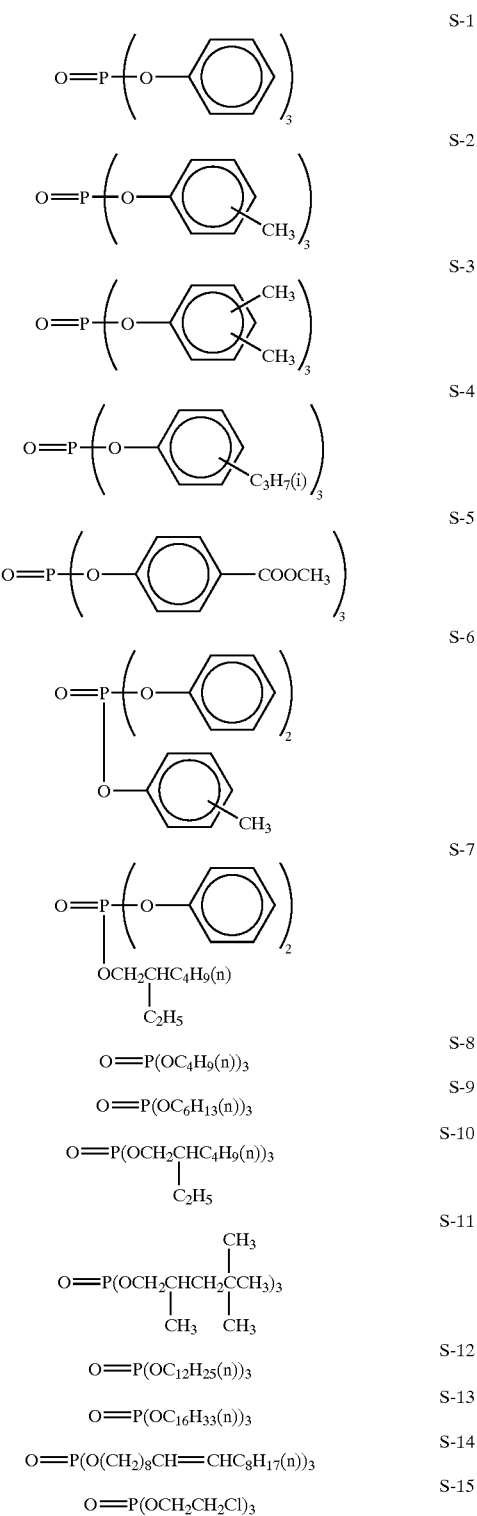

-continued
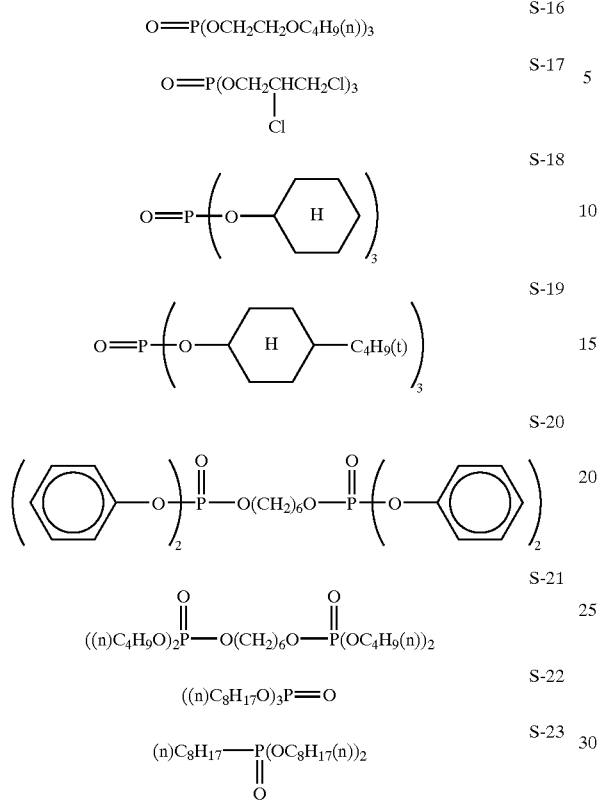
Compound Represented by the Formula [S-2]
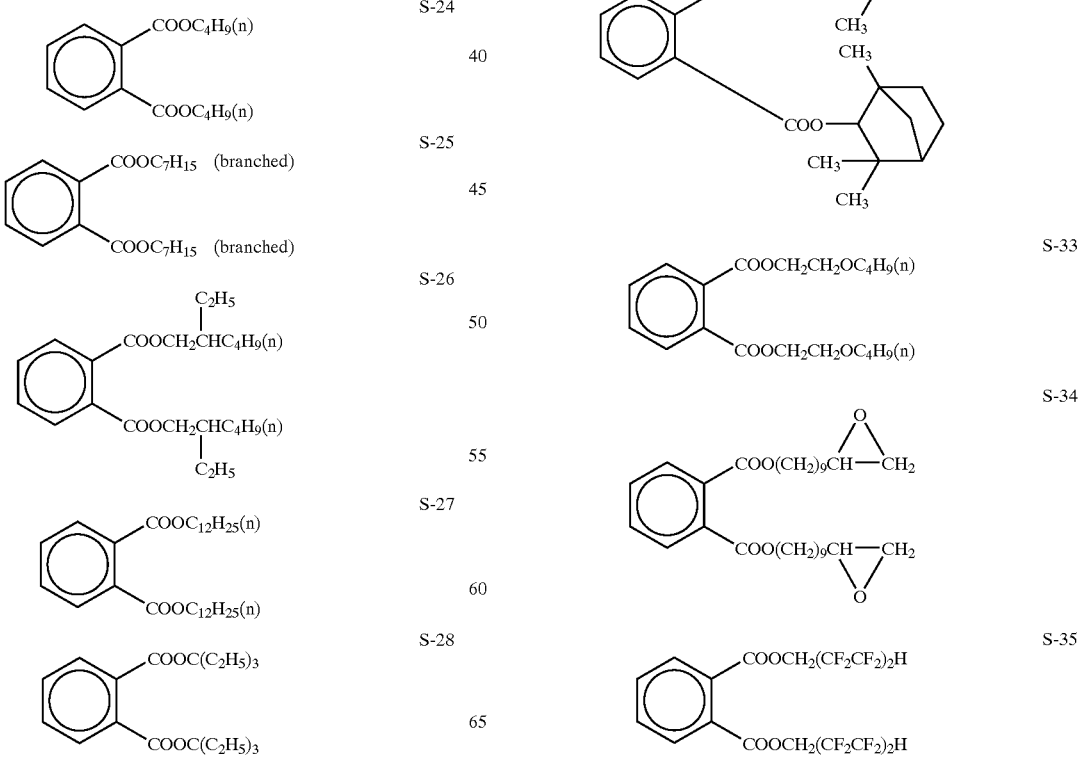

-continued
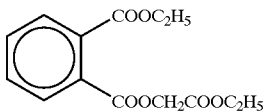
S-36
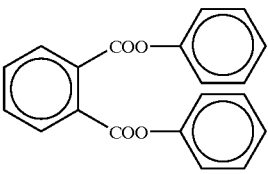
S-37
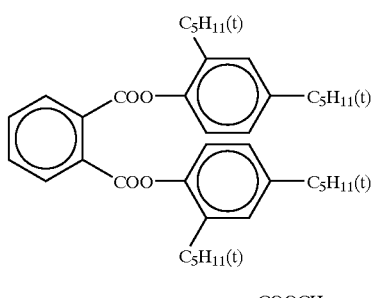
S-38
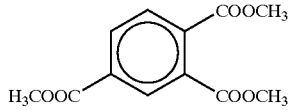
S-39
Compound Represented by the Formula [S-3]
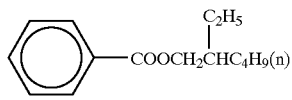
S-40
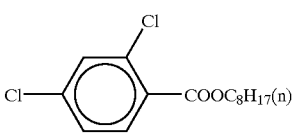
S-41
S-42
S-43
S-44
Compound Represented by the Formula [S-4]
(n)C$_{15}$H$_{31}$COOC$_{16}$H$_{33}$(n)
S-45
-continued
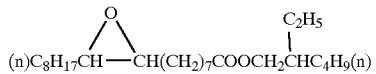
S-46
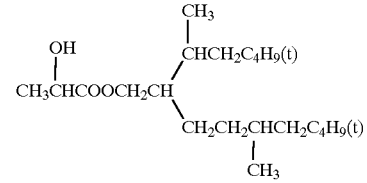
S-47
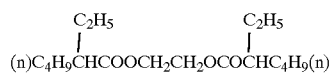
S-48
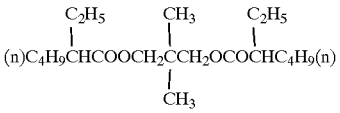
S-49
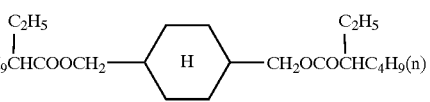
S-50
Compound Represented by the Formula [S-5]
S-51
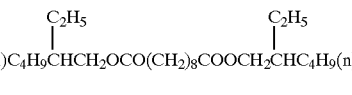
S-52
(n)C$_4$H$_9$OCO(CH$_2$)$_8$COOC$_4$H$_9$(n)
S-53
S-54
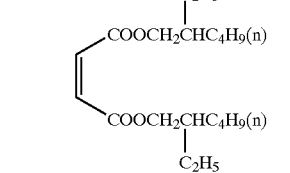
S-55
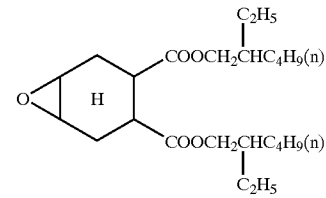
S-56
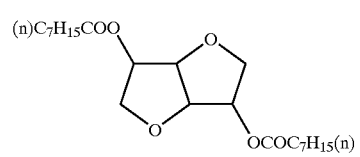
S-57

-continued
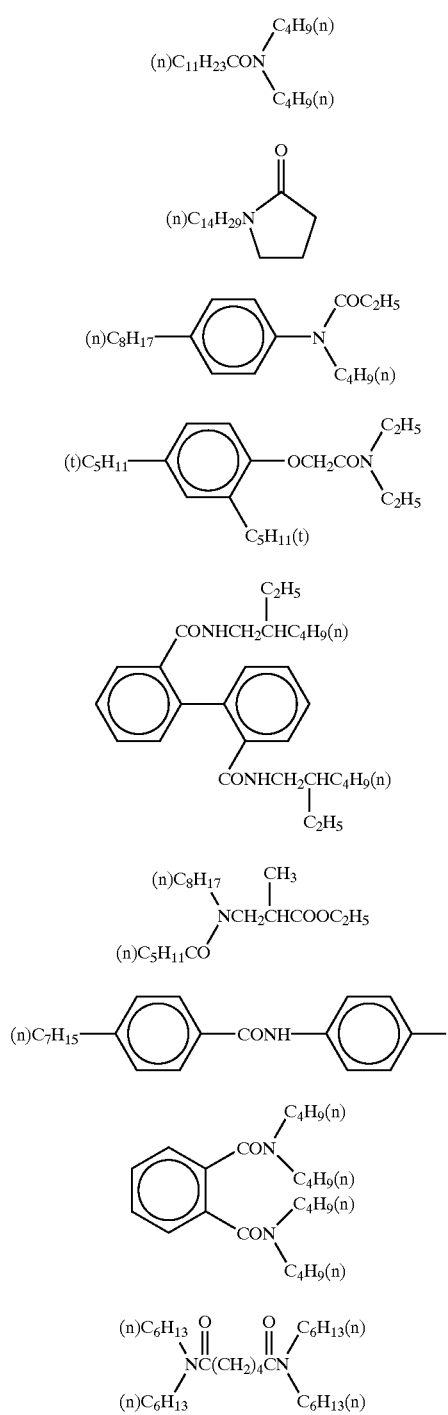
Compound Represented by the Formula [S-6]
Compound Represented by the Formula [S-7]
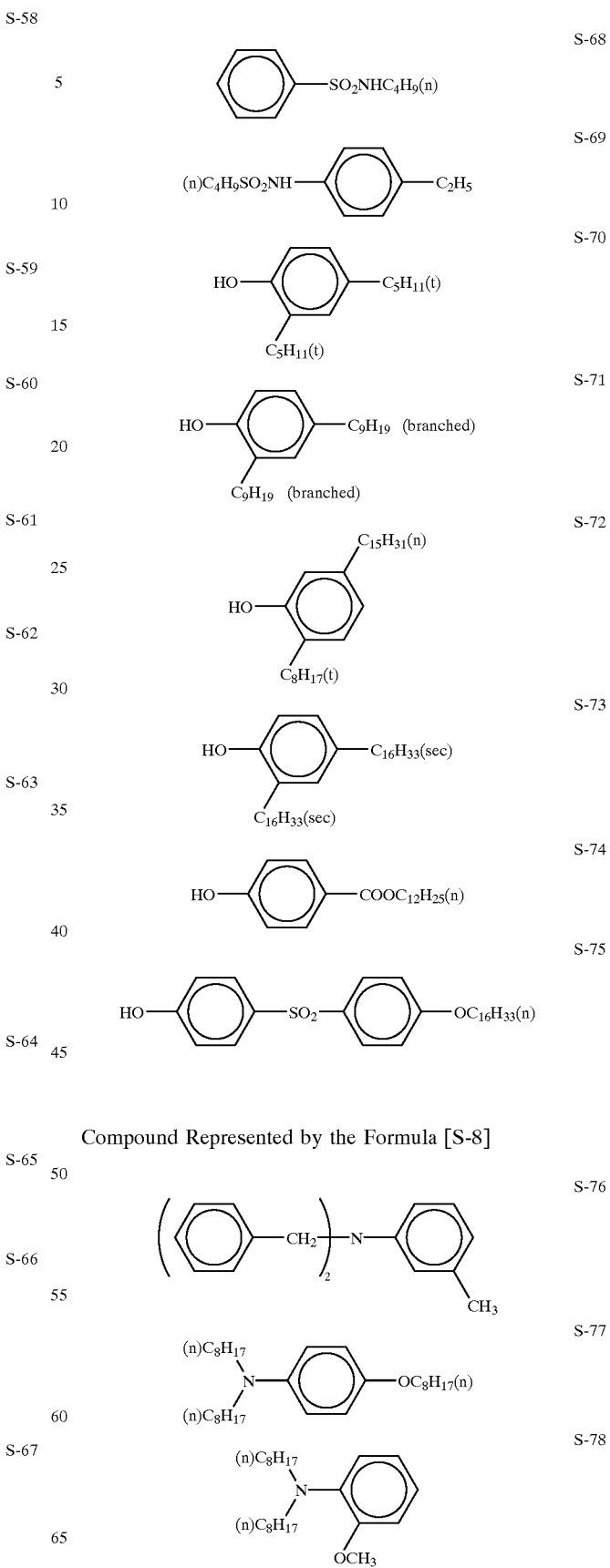
Compound Represented by the Formula [S-8]

-continued

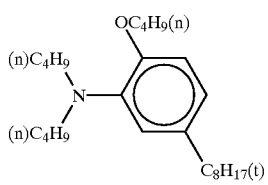

S-79

Compound Represented by the Formula [S-9]

$$(n)C_7H_{15}-\underset{\underset{O}{\|}}{S}-C_7H_{15}(n)$$

S-80

$$(n)C_4H_9CHCH_2-\underset{\underset{O}{\|}}{\overset{O}{\underset{\|}{S}}}-CH_2CHC_4H_9(n)$$
$$\quad\quad\quad\;\; |\quad\quad\quad\quad\quad\;\; |$$
$$\quad\quad\;\; C_2H_5\quad\quad\quad\;\; C_2H_5$$

S-81

These hydrophobic high boiling point organic solvents may be used alone or in combination of two or more. Examples of the combination include a combination of tricresyl phosphate and dibutyl phthalate, a combination of trioctyl phosphate and di(2-ethylhexyl)cebacate.

Examples of the hydrophobic high boiling point organic solvents, other than the above-mentioned examples, and/or examples of methods of synthesizing these hydrophobic high boiling point organic solvents are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-Nos. 276,319A, 286,253A, 289,820A, 309,158A, 309, 159A, 309,160A, 509,311A and 510,576A, East Germany Patent Nos. 147,009, 157,147, 159,573 and 225,240A, GB-2,091,124A, JP-A No. Nos. 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946 and 4-346338, and so on.

-Manufacturing of Coloring Composition Including Oil-Soluble Polymer-

A coloring composition in the present invention is formed by dispersing coloring particulates which contain an oil-soluble dye, a nonionic oil-soluble polymer, and the above hydrophobic high boiling point organic solvent in a water-based medium. More specifically, for example, there is a co-emulsification dispersing method, or a method in which latex of the above oil-soluble polymer is prepared in advance and the above oil-soluble dye and the above hydrophobic high boiling point organic solvent is impregnated into the latex. Among them, the above co-emulsification dispersing method is preferable.

The above co-emulsification dispersion can be implemented as follows. The above oil-soluble polymer and the above oil-soluble dye are dissolved into the above hydrophobic high boiling point organic solvent, or in some case, into a mixed solvent in which a low boiling point organic solvent and the hydrophobic high boiling point organic solvent are mixed. Accordingly, an oil phase is formed. The oil phase is dispersed in a water phase in which water is a main body, such that minute oil droplets having an oil-phase are formed. In the co-emulsification dispersion, a method in which the oil phase is added to the water phase is used in general. However, a so-called phase inversion emulsification method in which the water phase is dropped into the oil phase can be also used preferably. At the time of co-emulsification, additives such as a surfactant, a dry-preventing agent, a dye stabilizer, an emulsification stabilizer, an antiseptic, an antimold, and the like, which will be described later, can be added to one or both of the water phase and the oil phase, as occasion demands.

Various surfactants can be used in emulsification dispersion. For example, anionic surfactants such as fatty acid salts, alkylsulfate salts, alkylbenzenesuccinate salts, alkyl-naphthalenesulfonate salts, dialkylsulfosuccinate salts, alkylphosphate salts, naphthalenesulfonic acid formalin condensate, polyoxyethylenealkylsulfate salts and the like, and noionic surfactants such as polyoxyethylene alkyl ethers, polyoxyethylene alkylaryl ether, polyoxyethylene fatty acid esters, sorbitan fatty acid esters, polyoxyethylene sorbitan fatty acid esters, polyoxyethylene alkyl amines, glycerine fatty acid esters, oxyethylene oxypropylene block copolymers and the like, are preferable. Further, SUR-FYNOLS (Air Products & Chemicals), an acetylene-based polyoxyethylene oxide surfactant is also preferably used. Furthermore, amine oxide type ampholytic surfactants such as N,N-dimethyl-N-alkylamine oxide, and the like are also preferable. Further, surfactants listed in JP-A No. 59-157, 636, pp. (37) to (38) and Research Disclosure No. 308119 (1989) can be used.

For obtaining stability directly after emulsification, a water-soluble polymer can also be added together with the above-mentioned surfactant. As the water-soluble polymer, polyvinyl alcohols, polyvinylpyrrolidone, polyethylene oxide, polyacrylic acid, polyacrylamide, and copolymers thereof are preferably used. Further, it is also preferable to use naturally occurring water-soluble polymers such as polysaccharides, casein, gelatin and the like.

When a coloring particulate containing the oil-soluble polymer, the oil-soluble dye and the hydrophobic high boiling point organic solvent is dispersed into a water-based medium to give ink, control of particle size is particularly important. To enhance color purity and concentration when images are formed by ink jet, it is preferable to reduce the average particle size. Specifically, the volume-average particle size of the coloring particulate is preferably 100 nm or less, and more preferably 1 nm or more and 80 nm or less. Further, when the above-mentioned coloring particulate contains coarse particles, printing ability may be decreased. For example, there may be adverse influences on printing abilities, such as a case in which coarse particles cause clogging in a head, a case in which discharge failure or discharge drip of ink is caused by formation of stains even though no clogging occurs, and the like. Therefore, an existence ratio of coarse particles is preferably low, and it is preferable that, when ink is prepared, 10 or less particles having a particle size of 5 $\mu$m or more and 1000 or less particles having a particle size of 1 $\mu$m or more are present in 1 $\mu$l of the ink. For removing coarse particles, a known centrifugal separation method, precision filtration method or the like can be utilized. These separation means may be conducted directly after emulsifying dispersion, or may be conducted after adding various additives such as a wetting agent, surfactant and the like to an emulsified dispersion and directly before charging the mixture into an ink cartridge.

For decreasing the average particle size of a coloring particulate and reducing coarse particles, it is effective to use a mechanical emulsifying apparatus.

As an emulsifying apparatus used in the co-emulsification dispersing method, there can be used a known apparatus such as a simple stirrer or an impeller stirring mode apparatus, inline stirring mode apparatus, mill mode apparatus like a colloid mill or the like, ultrasonic mode apparatus, or the like. Use of a high pressure homogenizer is particularly preferable. Detailed mechanisms of the high pressure homogenizer are described in U.S. Pat. No. 4,533,254, JP-A No. 6-47264 and the like and, as a commercially available apparatus, GAULIN HOMOGENIZER (A.P.V Gaulin Inc.), MICROFLUIDIZER (Microfluidex Inc.), ALTIMIZER (Sugino Machine K. K.) and the like can be used. Recently, a high pressure homogenizer equipped with a mechanism to form fine particles in an ultrahigh pressure jet flow as described in U.S. Pat. No. 5,720,551 is particularly effective for emulsifying dispersion of the present invention. DEBEE2000 (Bee International Ltd.) is used as an example of this emulsifying apparatus using an ultrahigh pressure jet flow.

Pressure when emulsifying by a high pressure emulsifying dispersion apparatus is generally 50 MPa or more, preferably 60 MPa or more, and further preferably 180 MPa or more. It is particularly preferable to use two or more emulsifying apparatuses together in a method, for example a method in which emulsification is conducted by a stirring emulsifier, then the emulsion is passed through a high pressure homogenizer. Further, a method in which emulsification is once conducted by such a emulsification apparatus, then additives such as a wetting agent, a surfactant and the like are added, then the emulsion is again passed through a high pressure homogenizer when a cartridge is being filled with ink is also a preferable method. When a low boiling point organic solvent is used in addition to the hydrophobic high boiling point organic solvent, it is preferable to remove the low-boiling-point organic solvent from the standpoints of stability and health and safety of an emulsion. For removing the low boiling point organic solvent, various known methods can be used depending on the type of the solvent. Namely, a vaporization method, vacuum vapor deposition method, ultrafiltration method and the like can be used. It is preferable to conduct a removal process of this low boiling point organic solvent as quickly as possible directly after emulsification.

In the coloring composition of the present invention, the amount of the above oil-soluble polymer to be used is preferably 1 to 70% by mass based on the sum of the above oil-soluble dye, the above oil-soluble polymer, and the above hydrophobic high boiling point organic solvent which form the above oil phase, and is more preferably 2 to 50% by mass. Further, in the coloring composition of the present invention, the amount of the above hydrophobic high boiling point organic solvent to be used is preferably 25 to 95% by mass based on the sum of the above oil-soluble dye, the above oil-soluble polymer, and the above hydrophobic high boiling point organic solvent which form the above oil phase. The amount of the above hydrophobic high boiling point organic solvent to be used is more preferably 30 to 90% by mass, and is particularly preferably 40 to 85% by mass. Moreover, in the coloring composition of the present invention, the amount of the above oil-soluble dye to be used is preferably 1 to 70% by mass based on the sum of the above oil-soluble dye, the above oil-soluble polymer, and the above hydrophobic high boiling point organic solvent which form the above oil phase, and is more preferably 3 to 70% by mass.

-Organic Solvent-

An organic solvent used other than the hydrophobic high boiling point organic solvent for preparation of the coloring composition is not particularly restricted, and can be appropriately selected based on solubility of the oil-soluble dye and the oil-soluble polymer, and the like. For example, there are listed ketone-based solvents such as acetone, methyl ethyl ketone, diethyl ketone and the like, alcohol-based solvents such as methanol, ethanol, 2-propanol, 1-propanol, 1-butanol, tert-butanol and the like, chlorine-based solvents such as chloroform, methylene chloride and the like, aromatic solvents such as benzene, toluene and the like, ester-based solvents such as ethyl acetate, butyl acetate, isopropyl acetate and the like, ether-based solvents such as diethyl ether, tetrahydrofuran, dioxane and the like, glycol ether-based solvents such as ethylene glycol monomethyl ether, ethylene glycol dimethylether and the like, and other solvents.

The organic solvent may be used alone or in a combination of two or more. A mixed solvent with water may also be used depending on solubility of the above-mentioned dye and polymer.

The use amount of the organic solvent is not particularly restricted providing it is in a range wherein the effect of the present invention does not disappear, and is preferably from 10 to 200 parts by mass, and more preferably from 100 to 1000 parts by mass based on 100 parts by mass of the oil-soluble polymer. When the use amount of the organic solvent is less than 10 parts by mass, a fine and stable dispersion of coloring particulate tends to become difficult, and when over 2000 parts by mass, processes of de-solution and concentration for removing the above-mentioned organic solvent become essential and complicated, and tolerances in composition design tend to disappear.

When solubility of the organic solvent in water is less than 10%, or when the vapor pressure of the organic solvent is larger than that of water, it is preferable that the organic solvent is removed from the standpoint of stability of the coloring particulate dispersion.

It is preferable that, after the coloring composition is prepared, the organic solvent is removed. Removal can be conducted under from atmospheric pressure to reduced pressure at 10 to 100° C., and preferably under atmospheric pressure at 40 to 100° C. or under reduced pressure at 10 to 50° C.

-Additives-

The coloring composition of the present invention may contain additives which are appropriately selected in accordance with purposes within a range in which the effects of the present invention are not harmed.

The above-described additives include, for example, a dispersion stabilizer. The above dispersion stabilizer may be added to any of the above oil phase and the above water phase. However, it is preferable that the dispersion stabilizer is added after the end of the emulsification dispersion. The above dispersion stabilizer includes various types of cationic, anionic, nonionic surface active agents, a water-soluble or water-dispersible depolymerized compound, oligomer, and the like. The amount of the above dipersion stabilizer to be added is 0 to 100% by mass based on the sum of the oil-soluble dye and the above oil-soluble polymer, and is preferably 0 to 20% by mass.

In the coloring composition of the present invention, the coloring particulate is contained preferably in an amount from 1 to 45% by mass, and more preferably in an amount of 2 to 30% by mass. The above-mentioned content can be appropriately controlled depending on dilution, evaporation, ultrafiltration and the like.

The coloring composition of the present invention can be used in various fields, and is suitable for a water-based ink for writing, water-based printing ink, information recording ink and the like, and can be used particularly suitably for an ink-jet ink of the present invention, described below.

[Ink-Jet Ink and Ink Jet Recording Method]

The ink-jet ink of the present invention contains the above-mentioned coloring composition of the present invention, and other components appropriately selected as necessary.

In the ink jet recording method of the present invention, recording is conducted using the above-mentioned ink-jet ink, and an ink nozzle and the like used in the recording are not particularly restricted, and can be appropriately selected depending on objectives.

The above-mentioned other components are contained in ranges wherein the effect of the present invention does not disappear.

As the above-mentioned other components, examples include known additives such as a drying prevention agent, permeation promoting agent, ultraviolet ray absorber, antioxidant, anti-fungus agent, pH controlling agent, surface tension controlling agent, de-foaming agent, viscosity controlling agent, dispersion stabilizer, rust-prevention agent, chelating agent and the like.

The above-mentioned drying prevention agent is suitably used for the purpose of inhibiting clogging that is due to drying of the above-mentioned ink-jet ink at an ink discharge port of a nozzle used in the ink jet recording method.

As the above-mentioned drying prevention agent, a water-soluble organic solvent having a lower vapor pressure than that of water is preferable, and specific examples thereof include polyhydric alcohols, typified by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerine, trimethylolpropane and the like; lower alkyl ethers of polyhydric alcohol such as ethylene glycol monomethyl (or ethyl) ether, diethylene glycol monomethyl (or ethyl) ether, triethylene glycol monoethyl (or butyl) ether and the like; heterocyclic rings such as 2-pyrrolidone, N-methyl-2-pyrrolidone, 1,3-dimethyl-2-imidazolidinone, N-ethylmorpholine and the like; sulfur-containing compounds such as sulfolane, dimethylsulfoxide, 3-sulfolene and the like; polyfunctional compounds such as diacetone alcohol, diethanolamine and the like; and urea derivatives.

Of these, polyhydric alcohols such as glycerine, diethylene glycol and the like are more preferable. These drying prevention agents may be used alone or in a combination of two or more.

The content of the above-mentioned drying prevention agent in the above-mentioned ink-jet ink is preferably from 10 to 50% by mass.

The above-mentioned permeation promoting agent is suitably used for the purpose of more excellent permeation of the ink-jet ink into paper.

As the above-mentioned permeation promoting agent, there are listed, for example, alcohols such as ethanol, isopropanol, butanol, di(tri)ethylene glycol monobutyl ether, 1,2-hexanediol and the like, sodium laurylsulfate, sodium oleate, and nonionic surfactants and the like.

The above-mentioned permeation promoting agent is contained in an amount in a range wherein blotting of print, passing through paper (print through) and the like do not occur, and usually a sufficient effect is manifested when the permeation promoting agent is contained in an amount of about 5 to 30% by mass in the ink-jet ink.

The above-mentioned ultraviolet ray absorber is used for the purpose of improving storability of images.

As the above-mentioned ultraviolet ray absorber, there are listed, for example, benzotriazole-based compounds described in JP-A Nos. 58-185677, 61-190537, 2-782, 5-197075, 9-34057 and the like, benzophenone-based compounds described in JP-A Nos. 46-2784, 5-194483, U.S. Pat. No. 3,214,463 and the like, cinnamic acid-based compounds described in JP-B Nos. 48-30492, 56-21141, JP-A No. 10-88106 and the like, triazine compounds described in JP-A Nos. 4-298503, 8-53427, 8-239368, 10-182621, 8-501291 (PCT National Publication), and the like, compounds that emit fluorescence when absorbing ultraviolet rays, called fluorescent brighteners, typified by compounds described in Research Disclosure No. 24239, stilbene-based compounds and benzozazole-based compounds, and the like.

The above-mentioned antioxidant is used for the purpose of improving the storability of images.

As the above-mentioned antioxidant, examples that can be used include organic and metal complex-based discoloration preventing agents.

As the above-mentioned organic discoloration preventing agent, examples include hydroquinones, alkoxyphenols, dialkoxyphenols, phenols, anilines, amines, indanes, chromans, alkoxyanilines, heterocyclic rings and the like.

As the above-mentioned metal complex-based discoloration preventing agent, examples include a nickel complex, a zinc complex and the like, and specifically, there can be used compounds described in patents cited in Research Disclosure No. 17643, vol. VII, column I to J, No. 15162, No. 18716, page 650, left column, No. 36544, page 527, No. 307105, page 872 and No. 15162, and compounds included in examples and general formulae of typical compounds described in JP-A No. 62-215272, pp. 127 to 137.

As the above-mentioned anti-fungus agent, examples include dehydro sodium acetate, sodium benzoate, sodiumpyridienthione-1-oxide, ethyl p-hydroxybenzoate, 1,2-benzisothiazoline-3-one and salts thereof are listed. These are preferably used in an amount of 0.02 to 1.00% by mass in an ink.

As the above-mentioned pH controlling agent, the above-mentioned neutralizing agent (organic salt group or inorganic alkali) can be used. The above-mentioned pH controlling agent is added such that the above-mentioned ink-jet ink has a pH preferably of 6 to 10, and more preferably of 7 to 10, for the purpose of improving storage stability of the ink-jet ink.

As the above-mentioned surface tension controlling agent, nonionic, cationic or anionic surfactants are listed as examples.

The surface tension of the ink-jet ink of the present invention is preferably from 25 to 70 mN/m, and more preferably from 25 to 60 mN/m.

The viscosity of the ink-jet ink of the present invention is preferably 30 mPa·s or less, and more preferably 20 mPa·s or less.

As the above-mentioned defoaming agent, fluorine-based compounds and silicone-based compounds, and chelating agents typified by EDTA, and the like can also be used, if necessary.

The ink-jet ink of the present invention can be suitably printed on known recording materials, and the like. For example, normal paper, resin coated paper, ink jet dedicated paper, films, general electrophotography paper, cloth, glass, metals, ceramics and the like are listed.

The above-mentioned recording material is not particularly restricted, and ink jet dedicated paper is preferable.

As the above-mentioned ink jet dedicated paper, examples include those described in JP-A Nos. 8-169172, 8-27693, 2-276670, 7-276789, 9-323475, 62-238783, 10-153989, 10-217473, 10-235995, 10-337947, 10-217597, 10-337947 and the like.

In the present invention, there are suitably used the following recording paper and recording film, in addition to the above-mentioned ink jet dedicated paper, as the above-mentioned recording material.

The recording paper or recording film has a substrate with an ink receiving layer laminated thereon and, if necessary, has other layers such as a back coat layer and the like laminated thereto.

The layers typically including an ink receiving layer may be used each in a single layer, or in two or more layers.

As the above-mentioned substrate, examples include those made of chemical pulp such as LBKP, NBKP and the like, those made of mechanical pulp such as GP, PGW, RMP, TMP, CTMP, CMP CGP and the like, and those made of waste pulp such as DIP and the like. In the above-mentioned pulp, conventionally known pigments, binders, sizing agents, fixing agents, cationic agents, paper strength reinforcing agents and the like may be added and mixed as necessary. The above-mentioned substrate can be formed by using various apparatuses such as a long net paper machine, round net paper machine or the like.

The above-mentioned substrate may further be synthetic paper, plastic film sheet and the like.

The thickness of the above-mentioned substrate is from about 10 to 250 μm, and the basic weight is desirably from 10 to 250 g/m$^2$.

On the substrate, the ink receiving layer, and further the back coat layer selected as necessary, may be directly laminated, or the above-mentioned ink receiving layer and the above-mentioned back coat layer may be provided after a size press or anchor coat layer is formed of starch, polyvinyl alcohol or the like.

Further, on the substrate, a flattening treatment may be performed by a calendering machine such as a machine calender, TG calender, soft calender or the like.

Of the above-mentioned substrates, paper and plastic films laminated on both surfaces with a polyolefin (for example, polyethylene, polystyrene, polyethylene terephthalate, polybutene, or a copolymer thereof) are preferable, and it is more preferable that a white pigment (for example, titanium oxide, zinc oxide) or coloring dyer (for example, cobalt blue, ultramarine, neodymium oxide) is added in the above-mentioned polyolefin.

The above-mentioned ink receiving layer contains a pigment, water-based binder, mordanting agent, water resistant agent, light resistance improving agent, surfactant, and other additives.

As the pigment, a white pigment is preferable.

As the white pigment, there are listed, for example, inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfate, zinc carbonate and the like; and organic pigments such as styrene-based pigments, acrylic pigments, urea resins, melamine resins and the like.

Of these, porous inorganic pigments are preferable, and a synthetic amorphous silica having a large fine pore area or the like is particularly preferable.

As the above-mentioned synthetic amorphous silica, any of anhydrous silic acid obtained by a dry production method and water-containing silic acid obtained by a wet production method can be used, and water-containing silic acid is particularly preferable.

As the above-mentioned water-based binder, there are listed, for example, water-soluble polymers such as polyvinyl alcohol, silanol-modified polyvinyl alcohol, starch, cationized starch, casein, gelatin, carboxymethylcellulose, hydroxyethylcellulose, polyvinylpyrrolidone, polyalkylene oxide, polyalkylene oxide derivatives, and the like; and water-dispersible polymers such as styrene butadiene latex, acryl emulsion and the like.

These may be used alone or in a combination of two or more.

Of these, polyvinyl alcohol and silanol-modified polyvinyl alcohol are preferable from the standpoints of adhesion to the pigment and an anti-peeling property of the ink receiving layer.

The mordanting agent is preferably immobilized and, therefore, a polymer mordanting agent is preferable.

Regarding the above-mentioned polymer mordanting agent, examples are described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236, and U.S. Pat. Nos. 2,484,430, 2,548,564, 3,148,061, 3,309,690, 4,115,124, 4,124,386, 4,193,800, 4,273,853, 4,282,305, and 4,450,224. Polymer mordanting agents described in JP-A No. 1-161236, pp. 212 to 215 are suitably listed as examples. When these polymer mordanting agents are used, an image having excellent image quality is obtained, and light resistance of the image is improved, which is preferable.

The above-mentioned water resistant agent is used for the purpose of rendering an image water-resistant.

A cationic resin is preferable as the water-resistant agent.

As the cationic resin, there are listed, for example, polyamidepolyamineepichlorohydrin, polyethyleneimine, polyamineslfone, dimethyldiallylammonium chloride polymer, cation polyacrylamide and the like. Of these cationic resins, polyamidepolyamineepichlorohydrin is particularly preferable.

The content of the cationic resin is preferably from 1 to 15% by mass, and more preferably from 3 to 10% by mass based on the total solid component of the ink receiving layer.

As the light resistance improving agent, there are listed, for example, zinc sulfate, zinc oxide, hindered amine-based antioxidant, benzotriazole-based ultraviolet ray absorbers such as benzophenone and the like. Of these, zinc sulfate is particularly preferable.

The above-mentioned surfactant functions as a coating aid, peeling property improving agent, sliding property improving agent or antistatic agent.

As the surfactant, those described in JP-A Nos. 62-173463, 62-183457 are listed as examples.

An organic fluoro compound may be used instead of the surfactant.

The above-mentioned fluoro compound is preferably hydrophobic.

The fluoro compound includes, for example, a fluorine surfactant, oily fluorine compound (for example, fluorine oil) and a solid fluorine compound resins (for example, ethylene tetrafluoride resin), and examples include those described in JP-B No. 57-9053 (columns 8 to 17), and JP-A Nos. 61-20994 and 62-135826.

As the above-mentioned other additives, there are listed, for example, pigment dispersing agents, thickening agents, defoaming agents, dyes, fluorescent brighteners, preservatives, pH controlling agents, matting agents, film hardening agents and the like.

The back coat layer contains a white pigment, water-based binder, and other components.

As the white pigment, there are listed, for example, inorganic white pigments such as light calcium carbonate, heavy calcium carbonate, kaolin, talc, clay, calcium sulfate, barium sulfate, titanium dioxide, zinc oxide, zinc sulfate, zinc carbonate, satin white, aluminum silicate, diatomaceous earth, calcium silicate, magnesium silicate, synthetic amorphous silica, colloidal silica, colloidal alumina, pseudo bohemite, aluminum hydroxide, alumina, lithopone, zeolite, water-added halloysite, magnesium carbonate, magnesium hydroxide and the like; and organic pigments such as styrene-based plastic pigments, acrylic plastic pigments, polyethylene, microcapsule, urea resins, melamine resins and the like.

As the above-mentioned water-based binder, there are listed, for example, water-soluble polymers such as styrene/maleic acid salt copolymer, styrene/acrylic acid salt copolymer, polyvinyl alcohol, silanol-modified polyvinyl alcohol, starch, cationized starch, casein, gelatin, carboxymethylcellulose, hydroxyethylcellulose, polyvinylpyrrolidone, and the like; and water-dispersible polymers such as styrene butadiene latex, acryl emulsion and the like.

As the above-mentioned other components, examples include defoaming agents, foaming suppressing agents, dyes, fluorescent brighteners, preservatives, water resistance imparting agents and the like.

A polymer latex may be added to each layer of the above-mentioned recording paper or recording film.

The polymer latex is used for the purpose of improving film physical properties such as dimension stability, curl prevention, adhesion prevention, and film cracking prevention.

As the polymer latex, examples include those described in JP-A Nos. 62-245258, 62-136648 and 62-110066. If a polymer latex having a low glass transition temperature (40° C. or less) is added to a layer containing the above-mentioned mordanting agent, cracking and curl of the layer can be prevented. Further, if a polymer latex having a high glass transition temperature is added to the above-mentioned back coat layer, curl can be prevented.

In the ink jet recording method of the present invention, the recording medium used is not restricted, and if a recording medium having a substrate on which is laminated an ink receiving layer containing white pigment is used as the recording medium, the formed image obtains high image quality, which is preferable. In the case of a conventional ink, there is a problem that, when recording paper having an ink receiving layer containing a porous inorganic pigment such as a white pigment or the like is used, the sinking property into the recording paper is poor, and when the formed image is rubbed with a hand, dye is peeled off from the surface. In the case of the ink of the present invention, such a problem has been solved since the sinking property is excellent. Therefore, when the above-mentioned recording medium is used, an image having high image quality and high strength can be formed.

The ink-jet ink of the present invention can be applied to any ink jet recording method, and suitably used for, for example, an electric charge controlling method in which ink is discharged by utilizing an electrostatic attracting force, a drop-on-demand method (pressure pulse method) utilizing vibration pressure of a piezo element, an acoustic ink jet method in which an electric signal is converted into an acoustic beam, ink is irradiated with this beam and the ink is discharged by utilizing radiation pressure, a thermal ink jet (bubble jet) method in which ink is heated to form bubbles, and generated pressure is utilized, and the like.

The ink jet recording method includes a method in which an ink having a lower concentration, called a photo ink, is discharged though a lot of ports in small volume, a method in which an image is improved by using a plurality of inks having substantially the same hue and different concentrations, and a method using a colorless, transparent ink.

EXAMPLES

Examples of the present invention will be described hereinafter. However, the present invention is not limited to these examples at all.

Example 1

Production of Ink Set 101

8 g of the above magenta dye (the illustrative compound M-6) and 2 g of the above oil-soluble polymer (the illustrative compound P-5) were dissolved at 70° C. in the mixture of the hydrophobic high boiling point organic solvents (the illustrative compounds S-2 and S-11), 3.75 g of dioctyl sodium sulfosuccinate, and 50 ml of ethyl acetate. 500 ml of deionized water was added to the solution while stirring with a magnetic stirrer, and an oil-in-water type coarse particles dispersed product was produced.

Next, the obtained coarse particles dispersed product was passed five times through MICROFLUIDIZER (MICROFLUIDEX INC) at pressure of 60 MPa, such that fine particles were obtained. Further, the obtained emulsified product was desolvated by a rotary evaporator until odor of the ethyl acetate disappears. The coloring composition was thereby obtained.

Additives such as diethylene glycol, glycerin, SURFYNOL 465 (Air Products & Chemicals), urea, and the like were added to the obtained coloring composition, and thereafter, deionized water was added thereto. The pH of the coloring composition was adjusted to 9 using 1 mol/liter of KOH. Accordingly, a light magenta ink for ink jet was produced. The following Table 1 shows the composition of materials which are used for producing the obtained light magenta ink. Note that values in Table 1 show the amounts of content of respective materials which are converted into one liter of an ink. Regarding the obtained emulsified and dispersed ink, the volume average particle size of the coloring particulates was measured using MICROTRACK UPA (Nikkiso Co., Ltd.). The volume average particle size was 35 nm.

A type of dye, an amount of the hydrophobic high boiling point organic solvent, an amount of the above oil-soluble polymer, an amount of SURFYNOL 465, which had been used at the production of the above light magenta ink, were changed as those described in the following Table 1. Accordingly, a magenta ink, a light cyan ink, a cyan ink, a yellow ink, and a black ink were respectively produced. Ink Set 101 which are formed by six types of inks was produced.

TABLE 1

|  | Light Magenta Ink | | Magenta Ink | | Light Cyan Ink | | Cyan Ink | | Yellow Ink | | Black Ink | |
|---|---|---|---|---|---|---|---|---|---|---|---|---|
| Dye | M-6 | 5.00 g | M-6 | 20.0 g | C-1 | 9.3 g | C-1 | 37.2 g | YY-1 | 27.2 g | M-6 | 10.0 g |
|  |  |  |  |  |  |  |  |  |  |  | C-1 | 18.6 g |
|  |  |  |  |  |  |  |  |  |  |  | YY-1 | 13.6 g |
| High Boiling Point Organic Solvent | S-2 | 3.63 g | S-2 | 14.52 g | S-2 | 6.75 g | S-2 | 27.0 g | S-2 | 19.74 g | S-2 | 30.6 g |
|  | S-11 | 6.38 g | S-11 | 22.52 g | S-11 | 11.9 g | S-11 | 47.6 g | S-11 | 34.7 g | S-11 | 53.8 g |
| Oil-Soluble Polymer | P-S | 1.25 g | P-5 | 5.0 g | P-5 | 2.33 g | P-5 | 9.3 g | P-5 | 6.8 g | P-5 | 10.6 g |
| Dioctyl Sodium Sulfosuccinate | | 4.7 g | | 18.8 g | | 17.4 g | | 69.6 g | | 51.0 g | | 79.0 g |
| Diethylene Glycol | | 110.0 g | | 110.0 g | | 110.0 g | | 110.0 g | | 110.0 g | | 110.0 g |
| Urea | | 46.0 g | | 46.0 g | | 46.0 g | | 46.0 g | | 46.0 g | | 46.0 g |
| Glycerin | | 50.0 g | | 50.0 g | | 50.0 g | | 50.0 g | | 50.0 g | | 50.0 g |
| SURFYNOL 465 | | 5.5 g | | 5.5 g | | 5.5 g | | 5.5 g | | 5.5 g | | 5.5 g |
| Triethanolamine | | 7.5 g | | 7.5 g | | 7.5 g | | 7.5 g | | 7.5 g | | 7.5 g |
| Benzotriazole | | 0.075 g | | 0.075 g | | 0.075 g | | 0.075 g | | 0.075 g | | 0.075 g |
| Antiseptic Proxel XL2 | | 2.5 g | | 2.5 g | | 2.5 g | | 2.5 g | | 2.5 g | | 2.5 g |
| Volume Average Particle Size | | 35 nm | | 38 nm | | 37 nm | | 43 nm | | 45 nm | | 49 nm |

YY-1

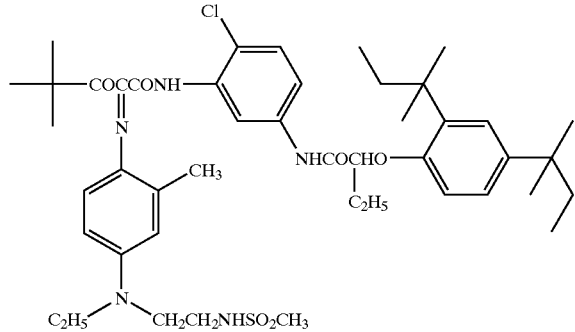

<Production of Ink Sets 102 to 113>

Next, the types and the amounts of the oil-soluble dye, the oil-soluble polymer, and the hydrophobic high boiling point organic solvent in the production of Ink Set 101 were changed as those described in the following Tables 2 to 5, and Ink Sets 104 to 107 and 110 to 112 were produced. Note that Ink Set 102 of Comparative Example is the one to which the above oil-soluble polymer was not added in the production of Ink Set 101 of Example, and that Ink Set 108 of Comparative Example is the one to which the above oil-soluble polymer was not added in the production of Ink Set 107 of Example. Further, Ink Set 103 of Comparative Example is the one to which the hydrophobic high boiling point organic solvent was not added in the production of Ink Set 101 of Example, and Ink Set 109 of Comparative Example is the one to which the hydrophobic high boiling point organic solvent was not added in the production of Ink Set 107 of Example. Moreover, Ink Set 113 of Comparative Example, in which water-soluble dye was used instead of the oil-soluble dye, was produced in the composition shown in the following Table 6.

TABLE 2

| Ink Set | | Light Magenta Ink | Magenta Ink | Light Cyan Ink | Cyan Ink | Yellow Ink | Black Ink | Remarks |
|---|---|---|---|---|---|---|---|---|
| 101 | Dye | M-6 5.00 g | M-6 20.0 g | C-1 9.3 g | C-1 37.2 g | YY-1 27.2 g | M-6 10.0 g | Example |
|  |  |  |  |  |  |  | C-1 18.6 g |  |
|  |  |  |  |  |  |  | YY-1 13.6 g |  |

TABLE 2-continued

| Ink Set | | Light Magenta Ink | Magenta Ink | Light Cyan Ink | Cyan Ink | Yellow Ink | Black Ink | Remarks |
|---|---|---|---|---|---|---|---|---|
| | HBPOS*1 S-2/S-11 | 3.63 g/ 6.38 g | 14.52 g/ 25.52 g | 6.75 g/ 11.9 g | 27.0 g/ 47.6 g | 19.7 g/ 34.7 g | 30.6 g/ 53.8 g | |
| | OSP*2 | P-5 1.25 g | P-5 5.0 g | P-5 2.33 g | P-5 9.3 g | P-5 6.8 g | P-5 10.6 g | |
| | VAPS*3 | 35 nm | 38 nm | 37 nm | 43 nm | 45 nm | 49 nm | |
| 102 | Dye | M-6 5.00 g | M-6 20.0 g | C-1 9.3 g | C-1 37.2 g | YY-1 27.2 g | M-6 10.0 g C-1 18.6 g YY-1 13.6 g | Comparative Example |
| | HBPOS*1 S-2/S-11 | 3.63 g/ 6.38 g | 14.52 g/ 25.52 g | 6.75 g/ 11.9 g | 27.0 g/ 47.6 g | 19.7 g/ 34.7 g | 30.6 g/ 53.8 g | |
| | OSP*2 | — | — | — | — | — | — | |
| | VAPS*3 | 25 nm | 41 nm | 29 nm | 39 nm | 33 nm | 40 nm | |
| 103 | Dye | M-6 5.00 g | M-6 20.0 g | C-1 9.3 g | C-1 37.2 g | YY-1 27.2 g | M-6 10.0 g C-1 18.6 g YY-1 13.6 g | Comparative Example |
| | HBPOS*1 | — | — | — | — | — | — | |
| | OSP*2 | P-5 10.0 g | P-5 40.0 g | P-5 18.6 g | P-5 74.6 g | P-5 54.6 g | P-5 84.4 g | |
| | VAPS*3 | 43 nm | 55 nm | 45 nm | 75 nm | 60 nm | 83 nm | |

*1HBPOS = High Boiling Point Organic Solvent
*2OSP = Oil-Soluble Polymer
*3VAPS = Volume Average Particle Size

TABLE 3

| Ink Set | | Light Magenta Ink | Magenta Ink | Light Cyan Ink | Cyan Ink | Yellow Ink | Black Ink | Remarks |
|---|---|---|---|---|---|---|---|---|
| 104 | Dye | M-6 5.00 g | M-6 20.0 g | C-1 9.3 g | C-1 37.2 g | YY-1 27.2 g | M-6 10.0 g C-1 18.6 g YY-1 13.6 g | Example |
| | HBPOS*1 S-2/S-11 | 3.63 g/ 6.38 g | 14.52 g/ 25.52 g | 6.75 g/ 11.9 g | 27.0 g/ 47.6 g | 19.7 g/ 34.7 g | 30.6 g/ 53.8 g | |
| | OSP*2 | P-2 1.25 g | P-2 5.0 g | P-2 2.33 g | P-2 9.3 g | P-2 6.8 g | P-2 10.6 g | |
| | VAPS*3 | 38 nm | 39 nm | 35 nm | 46 nm | 38 nm | 52 nm | |
| 105 | Dye | M-6 5.00 g | M-6 20.0 g | C-1 9.3 g | C-1 37.2 g | YY-1 27.2 g | M-6 10.0 g C-1 18.6 g YY-1 13.6 g | Example |
| | HBPOS*1 S-2/S-11 | 3.63 g/ 6.38 g | 14.52 g/ 25.52 g | 6.75 g/ 11.9 g | 27.0 g/ 47.6 g | 19.7 g/ 34.7 g | 30.6 g/ 53.8 g | |
| | OSP*2 | P-15 1.0 g P-24 1.0 g | P-15 4.0 g P-24 4.0 g | P-15 1.86 g P-24 1.86 g | P-15 7.44 g P-24 7.44 g | P-15 5.44 g P-24 5.44 g | P-15 8.48 g P-24 8.48 g | |
| | VAPS*3 | 33 nm | 36 nm | 32 nm | 42 nm | 38 nm | 44 nm | |
| 106 | Dye | M-6 5.00 g | M-6 20.0 g | C-1 9.3 g | C-1 37.2 g | YY-1 27.2 g | M-6 10.0 g C-1 18.6 g YY-1 13.6 g | Example |
| | HBPOS*1 S-9/S-24 | 4.0 g/ 6.0 g | 16.0 g/ 24.0 g | 7.44 g/ 11.2 g | 25.8 g/ 38.8 g | 21.8 g/ 32.6 g | 33.7 g/ 50.6 g | |
| | OSP*2 | P-6 1.25 g | P-6 5.0 g | P-6 2.33 g | P-6 9.3 g | P-6 6.8 g | P-6 10.6 g | |
| | VAPS*3 | 33 nm | 35 nm | 39 nm | 48 nm | 42 nm | 51 nm | |

*1HBPOS = High Boiling Point Organic Solvent
*2OSP = Oil-Soluble Polymer
*3VAPS = Volume Average Particle Size

TABLE 4

| Ink Set | | Light Magenta Ink | Magenta Ink | Light Cyan Ink | Cyan Ink | Yellow Ink | Black Ink | Remarks |
|---|---|---|---|---|---|---|---|---|
| 107 | Dye | MM-2 3.6 g | MM-2 14.4 g | CC-2 17.4 g | CC-2 69.6 g | YY-2 26.5 g | MM-2 6.5 g CC-2 34.8 g YY-2 13.3 g | Example |
| | HBPOS*1 S-2/S-11 | 2.6 g/ 4.6 g | 10.5 g/ 18.5 g | 12.6 g/ 22.1 g | 50.5 g/ 88.7 g | 19.2 g/ 33.7 g | 39.6 g/ 69.6 g | |
| | OSP*2 | P-3 0.9 g | P-3 3.6 g | P-3 4.35 g | P-3 17.4 g | P-3 6.6 g | P-3 13.7 g | |
| | VAPS*3 | 32 nm | 35 nm | 41 nm | 53 nm | 41 nm | 59 nm | |
| 108 | Dye | MM-2 3.6 g | MM-2 14.4 g | CC-2 17.4 g | CC-2 69.6 g | YY-2 26.5 g | MM-2 6.5 g CC-2 34.8 g YY-2 13.3 g | Comparative Example |

TABLE 4-continued

| Ink Set | | Light Magenta Ink | Magenta Ink | Light Cyan Ink | Cyan Ink | Yellow Ink | Black Ink | Remarks |
|---|---|---|---|---|---|---|---|---|
| | HBPOS*1 S-2/S-11 | 2.6 g/ 4.6 g | 10.5 g/ 18.5 g | 12.6 g/ 22.1 g | 50.5 g/ 88.7 g | 19.2 g/ 33.7 g | 39.6 g/ 69.6 g | |
| | OSP*2 | — | — | — | — | — | — | |
| | VAPS*3 | 29 nm | 33 nm | 40 nm | 63 nm | 44 nm | 57 nm | |
| 109 | Dye | MM-2 3.6 g | MM-2 14.4 g | CC-2 17.4 g | CC-2 69.6 g | YY-2 26.5 g | MM-2 6.5 g CC-2 34.8 g YY-2 13.3 g | Comparative Example |
| | HBPOS*1 | — | — | — | — | — | — | |
| | OSP*2 | P-3 7.2 g | P-3 28.8 g | P-3 34.8 g | P-3 139.2 g | P-3 53.0 g | P-3 109.2 g | |
| | VAPS*3 | 38 nm | 43 nm | 49 nm | 93 nm | 65 nm | 86 nm | |

*1HBPOS = High Boiling Point Organic Solvent
*2OSP = Oil-Soluble Polymer
*3VAPS = Volume Average Particle Size

TABLE 5

| Ink Set | | Light Magenta Ink | Magenta Ink | Light Cyan Ink | Cyan Ink | Yellow Ink | Black Ink | Remarks |
|---|---|---|---|---|---|---|---|---|
| 110 | Dye | MM-2 3.6 g | MM-2 14.4 g | CC-2 17.4 g | CC-2 69.6 g | YY-2 26.5 g | MM-2 6.5 g CC-2 34.8 g YY-2 13.3 g | Example |
| | HBPOS*1 S-2/S-11 | 2.6 g/ 4.6 g | 10.5 g/ 18.5 g | 12.6 g/ 22.1 g | 50.5 g/ 88.7 g | 19.2 g/ 33.7 g | 39.6 g/ 69.6 g | |
| | OSP*2 | P-4 0.72 g P-23 0.72 g | P-4 2.88 g P-23 2.88 g | P-4 3.48 g P-23 3.48 g | P-4 13.9 g P-23 13.9 g | P-4 5.3 g P-23 5.3 g | P-4 10.9 g P-23 10.9 g | |
| | VAPS*3 | 31 nm | 37 nm | 40 nm | 50 nm | 43 nm | 51 nm | |
| 111 | Dye | MM-2 3.6 g | MM-2 14.4 g | CC-2 17.4 g | CC-2 69.6 g | YY-2 26.5 g | MM-2 6.5 g CC-2 34.8 g YY-2 13.3 g | Example |
| | HBPOS*1 S-2/S-11 | 2.6 g/ 4.6 g | 10.5 g/ 18.5 g | 12.6 g/ 22.1 g | 50.5 g/ 88.7 g | 19.2 g/ 33.7 g | 39.6 g/ 69.6 g | |
| | OSP*2 | P-28 0.9 g | P-28 3.6 g | P-28 4.35 g | P-28 17.4 g | P-28 6.6 g | P-28 13.7 g | |
| | VAPS*3 | 40 nm | 42 nm | 48 nm | 78 nm | 60 nm | 92 nm | |
| 112 | Dye | MM-3 3.6 g | MM-3 14.4 g | CC-3 17.4 g | CC-3 69.6 g | YY-2 26.5 g | MM-3 6.5 g CC-3 34.8 g YY-2 13.3 g | Example |
| | HBPOS*1 S-9/S-24 | 2.88 g/ 4.32 g | 11.5 g/ 17.3 g | 13.9 g/ 20.9 g | 55.7 g/ 83.5 g | 21.2 g/ 31.8 g | 43.6 g/ 65.5 g | |
| | OSP*2 | P-5 0.9 g | P-5 3.6 g | P-5 4.35 g | P-5 17.4 g | P-5 6.8 g | P-5 13.7 g | |
| | VAPS*3 | 34 nm | 37 nm | 42 nm | 58 nm | 42 nm | 60 nm | |

*1HBPOS = High Boiling Point Organic Solvent
*2OSP = Oil-Soluble Polymer
*3VAPS = Volume Average Particle Size
YY-2

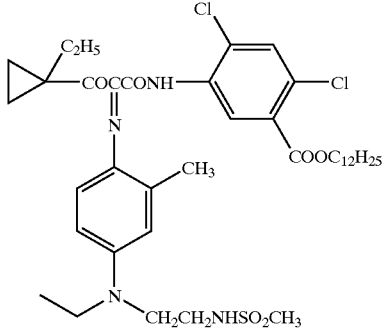

TABLE 5-continued
| Ink Set | Light Magenta Ink | Magenta Ink | Light Cyan Ink | Cyan Ink | Yellow Ink | Black Ink | Remarks |
| --- | --- | --- | --- | --- | --- | --- | --- |
MM-2
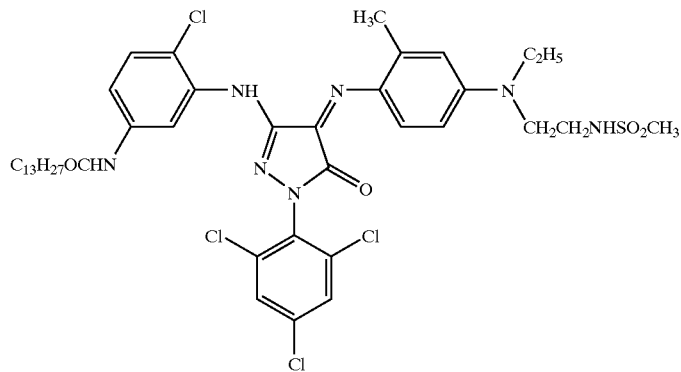
MM-3
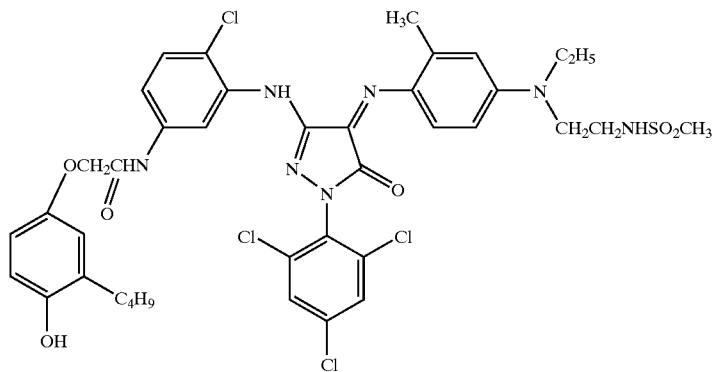
CC-2
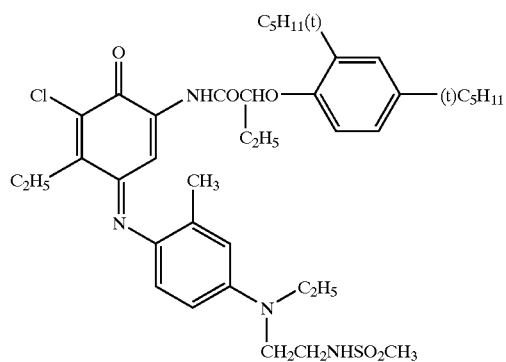

TABLE 5-continued
| Ink Set | Light Magenta Ink | Magenta Ink | Light Cyan Ink | Cyan Ink | Yellow Ink | Black Ink | Remarks |
|---|---|---|---|---|---|---|---|
| CC-3 | | | | | | | |
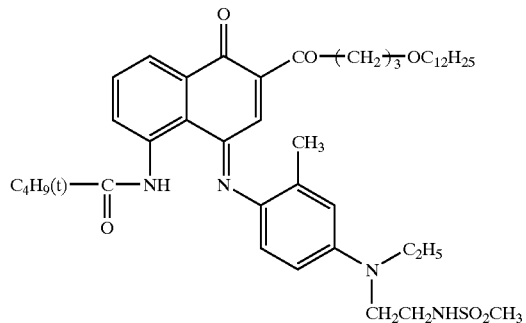
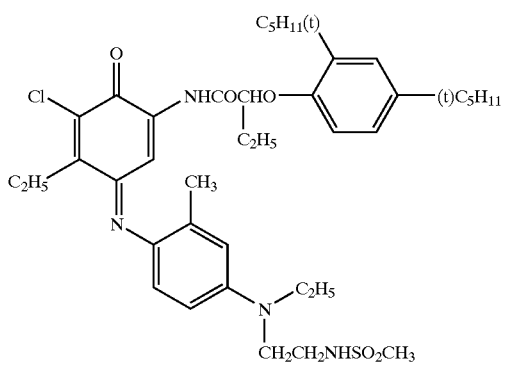
CC-2
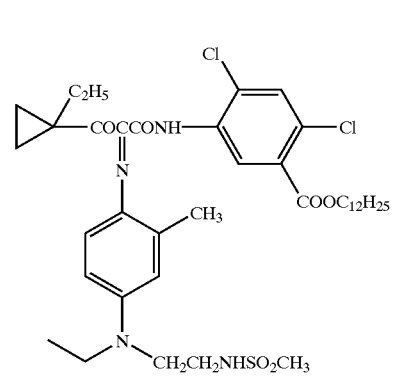
YY-2
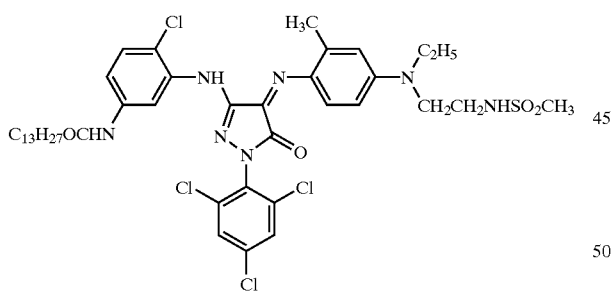
MM-2
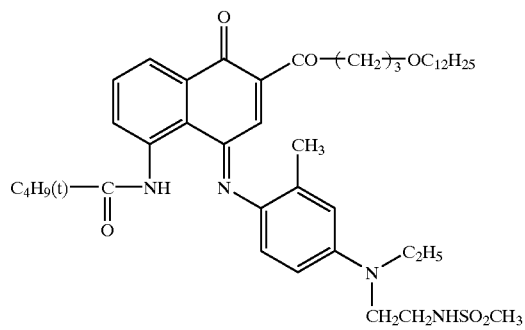
CC-3
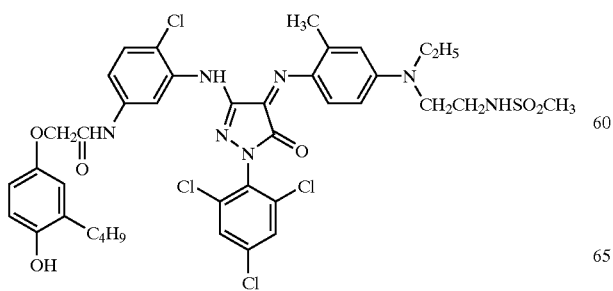
MM-3

TABLE 6

| | Light Magenta Ink | | Meagenta Ink | | Light Cyan Ink | | Cyan Ink | | Yellow Ink | | Black Ink | |
|---|---|---|---|---|---|---|---|---|---|---|---|---|
| Dye | A-1 | 7.0 g | A-1 | 28.0 g | A-2 | 8.75 g | A-2 | 35.0 g | A-3 | 14.7 g | A-5 | 20.0 g |
| | | | | | | | | | A-4 | 14.0 g | A-6 | 20.0 g |
| | | | | | | | | | | | A-7 | 20.0 g |
| | | | | | | | | | | | A-3 | 21.0 g |
| Diethylene Glycol | 150.0 g | | 110.0 g | | 130.0 g | | 200.0 g | | 160.0 g | | 20.0 g | |
| Urea | 37.0 g | | 46.0 g | | — | | — | | — | | — | |
| Glycerin | 130.0 g | | 130.0 g | | 150.0 g | | 180.0 g | | 150.0 g | | 120.0 g | |
| Triethylene Glycol Monobutyl Ether | 130.0 g | | 140.0 g | | 130.0 g | | 140.0 g | | 130.0 g | | — | |
| Diethylene Glycol Monobutyl Ether | — | | — | | — | | — | | — | | 230.0 g | |
| 2-Pyrrolidone | — | | — | | — | | — | | — | | 80.0 g | |
| SURFYNOL 465 | 10.5 g | | 11.5 g | | 11.1 g | | 9.8 g | | — | | — | |
| SURFYNOL TG | — | | — | | — | | — | | 9.0 g | | 8.5 g | |
| Triethanolamine | 6.9 g | | 7.4 g | | 6.8 g | | 6.7 g | | 0.8 g | | 17.9 g | |
| Benzotriazole | 0.08 g | | 0.07 g | | 0.08 g | | 0.08 g | | 0.06 g | | 0.06 g | |
| Antiseptic Proxel XL2 | 3.5 g | | 2.5 g | | 1.8 g | | 2.0 g | | 2.5 g | | 1.8 g | |

A-1

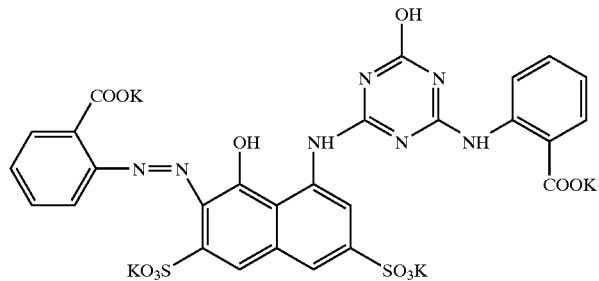

A-2

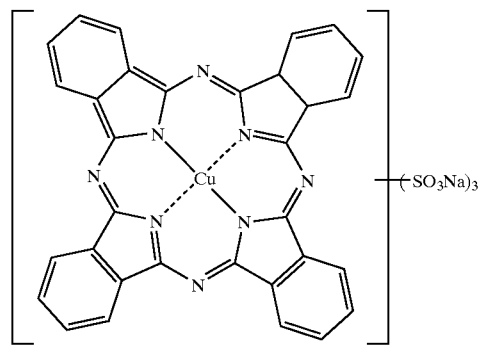

A-3

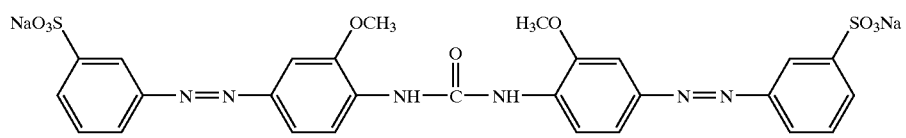

TABLE 6-continued

| | Light Magenta Ink | Meagenta Ink | Light Cyan Ink | Cyan Ink | Yellow Ink | Black Ink |
|---|---|---|---|---|---|---|

A-4

[Chemical structure: naphthalene-SO3Na with SO3Na substituent, connected via N=N to methylphenyl, then NH to triazine ring (with NHCH2CH2OH substituent), then NH to methylphenyl, then N=N to naphthalene with two SO3Na groups]

A-5

[Chemical structure: phenyl with (H4NO)2OP substituent, N=N to benzene ring with OC2H5 and C2H5O substituents, N=N to naphthalene with OH, NH2, and H4NO3S substituents]

A-6

[Chemical structure: benzene with two H4NOOC groups, N=N to naphthalene, N=N to naphthalene with OH, NH2, and H4NO3S substituents]

A-7

[Chemical structure: phenyl with H4NOOC substituent, N=N to benzene with OC2H5 and C2H5O substituents, N=N to naphthalene with OH, NH2, and H4NO3S substituents]

Next, the produced Ink Sets 101 to 113 were filled into a cartridge of an ink jet printer, PM670C (manufactured by EPSON), images were printed on ink jet paper, photo gloss paper EX (recording paper in which an ink receiving layer contains a white pigment) manufactured by Fuji Photo Film Co., Ltd,. using the same machine, and the following evaluations were conducted. The evaluation results are shown in the following Tables 7 and 8.

Evaluation of Printing Ability (1)

The cartridge was set in the printer, discharge of an ink from all nozzles was confirmed, and then images were output on 20 pieces of A4 paper and disturbance of printing was evaluated according to the following standards.

A: No disturbance from initiation to completion of printing.

B: Some disturbances occurred at some times from initiation to completion of printing.

C: Disturbances occurred from initiation to completion of printing.

Evaluation of Printing Ability (2)

The cartridge was left at room temperature to 60° C. for 3 days, and then disturbance of printing was evaluated according to the same standards as in Evaluation of printing ability (1).

Evaluation of Drying Property

Images were printed in the same manner as described above and, immediately, the image parts were touched with a finger; generated staining was evaluated visually. "○" in the drying property column in Table 7 indicates that no stain was generated.

Evaluation of Blotting of Narrow Lines

Narrow line patterns of yellow, magenta, cyan and black were printed, and evaluated visually (Evaluation of blotting of narrow lines (1)). For black, a magenta ink was printed in solid condition, then, black narrow lines were printed, and blotting by contact of the two colors was evaluated (Evaluation of blotting of narrow lines (2)). "○" in the columns of blotting of narrow lines (1) and (2) in Table 7 indicates that no blotting was recognized, and "Δ" indicates that slight blotting was recognized.

Evaluation of Water Resistance

Images formed in the same manner were immersed in deionized water for 10 seconds, then blotting generated on image parts was evaluated visually. "○" in the water resistance column indicates that no blotting occurred, and "×" indicates that blotting occurred.

Evaluation of Over Abrasion

Images were printed in the same manner, left for 30 minutes, and abraded with a rubber eraser, and presence or absence of change in concentration of image parts was visually evaluated. In Table 7, "A" in the column of over abrasion indicates an excellent result in which change in concentration was scarcely recognized, and "B" indicates a bad result in which change in concentration was recognized.

Evaluation of Paper Dependency of Hue

Images were formed on the above-mentioned photo gloss paper and normal paper for PPC, respectively, hues on both image parts were compared, and evaluated into two levels, namely, when hue difference was small, "A", and when hue difference was large, "B".

Regarding storability of images, print samples of Yellow (Y), Magenta (M), Cyan (C) and Black (BK) were produced, respectively, and light fastness and dark heat storability were evaluated as follows.

Evaluation of Light Fastness

Image concentration Ci directly after printing was measured with X-RITE 310, then the image was irradiated with a xenon light (85000 lux) for 5 days using WEATHER-O-METER manufactured by Atlas. Then the image concentration Cf was measured again, and the pigment remaining ratio Cf/Ci×100 was measured and evaluated. The pigment remaining ratio was evaluated at 3 points with reflection concentration levels of 1, 1.5 and 2 and A in which the pigment remaining ratio was 80% or more at every concentration is represented by "A", a case in which the pigment remaining ratio was less than 80% at two levels is represented by "B", and a case in which the pigment remaining ratio was less than 80% at all levels is represented by "C".

Evaluation of Dark Heat Storability

The image concentration of the print sample was measured with C-RITE 310 before and after storage for 7 days under a condition of 80° C. 70% RH, and the pigment remaining ratio was calculated. The pigment remaining ratio was evaluated at 3 reflection concentration levels of 1, 1.5 and 2. A case in which the pigment remaining ratio was 90% or more at every concentration is represented by "A", a case in which the pigment remaining ratio was less than 90% at two levels is represented by "B", and a case in which the pigment remaining ratio was less than 90% at all levels is represented by "C".

TABLE 7

| Ink Set | Printing Ability (1) | Printing Ability (2) | Drying Property | Blotting of Narrow Lines (1) | Blotting of Narrow Lines (2) | Water Resistance | Over Abrasion Property | Paper Dependency |
|---|---|---|---|---|---|---|---|---|
| 101 | A | A | ○ | ○ | ○ | ○ | A | ○ |
| 102 | A | B | ○ | ○ | ○ | ○ | A | ○ |
| 103 | A | B | ○ | ○ | ○ | ○ | B | ○ |
| 104 | A | A | ○ | ○ | ○ | ○ | A | ○ |
| 105 | A | A | ○ | ○ | ○ | ○ | A | ○ |
| 106 | A | A | ○ | ○ | ○ | ○ | A | ○ |
| 107 | A | B | ○ | ○ | ○ | ○ | A | ○ |
| 108 | A | B | ○ | ○ | ○ | ○ | A | ○ |
| 109 | A | B | ○ | ○ | ○ | ○ | B | ○ |
| 110 | A | B | ○ | ○ | ○ | ○ | A | ○ |
| 111 | A | B | ○ | ○ | ○ | ○ | A | ○ |
| 112 | A | B | ○ | ○ | ○ | ○ | A | ○ |
| 113 | A | A | ○ | Δ | Δ | X | A | X |

TABLE 8

| Ink Set | Light Fastness | | | | Humidity Heat Fastness | | | |
|---|---|---|---|---|---|---|---|---|
| | Y | M | C | BK | Y | M | C | BK |
| 101 | A | A | A | A | A | A | A | A |
| 102 | A | A | A | A | B | A | A | A |
| 103 | A | A | A | A | A | A | A | A |
| 104 | A | A | A | A | A | A | A | A |
| 105 | A | A | A | A | A | A | A | A |
| 106 | A | A | A | A | A | A | A | A |
| 107 | A | A | A | A | A | A | A | A |
| 108 | A | A | A | A | B | A | A | A |
| 109 | A | A | A | A | A | A | A | A |
| 110 | A | A | A | A | A | A | A | A |
| 111 | A | A | A | A | A | A | A | A |
| 112 | A | A | A | A | A | A | A | A |
| 113 | A | C | A | B | A | B | A | A |

The evaluation results revealed an excellent ability of the ink of the example that it is excellent in printing ability, has high water resistance, stiffness and over abrasion resistance, and has low paper dependency. Also, when narrow lines are output, the narrow lines cause no blotting and are excellent. Particularly when M-6 and C-1 are used as the oil-soluble dye, images having extremely excellent color reproducibility are obtained.

Further, the same evaluation results were obtained even when the recording paper was replaced by "PM PHOTO PAPER" manufactured by EPSON and "PR101" manufactured by CANON.

Example 2

The Ink Sets 101 to 113 produced in Example 1 were filled into a cartridge of an ink jet printer, BJ-F850 (manufactured by CANON), images were printed on ink jet paper, photo gloss paper EX (recording paper in which an ink receiving layer contains a white pigment), manufactured by Fuji Photo Film Co., Ltd,. using the same machine, and the same evaluations as in Example 1 were conducted. As a result, the same evaluation results as in Example 1 were obtained. Further, the same evaluation results were obtained even when the recording paper was replaced by "PM PHOTO PAPER" manufactured by EPSON and "PR101" manufactured by CANON.

What is claimed is:

1. An ink-jet ink which contains a coloring composition formed by dispersing coloring particulates in a water-based medium, the coloring particulates containing a nonionic oil-soluble polymer, a hydrophobic high boiling point organic solvent having a boiling point of 150° C. or more, and an oil-soluble dye, wherein the oil-soluble dye is represented by the following general formula (I):

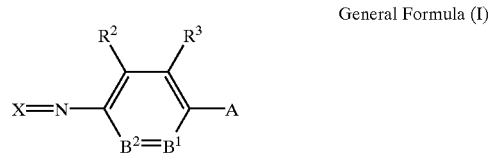

General Formula (I)

wherein, X represents the residue of a color coupler;

A represents $-NR^4R^5$ or a hydroxyl group;

$R^4$ and $R^5$ represent respectively independently a hydrogen atom, an aliphatic group, an aromatic group, or a heterocyclic group;

$B^1$ represents =C($R^6$)— or =N—;

$B^2$ represents —C($R^7$)= or —N=;

$R^2$, $R^3$, $R^6$, and $R^7$ represent respectively independently a hydrogen atom, a halogen atom, an aliphatic group, an aromatic group, a heterocyclic group, a cyano group, —$SR^{51}$, —$SR^{52}$, —$CO_2R^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$, or —$NR^{70}SO_2R^{71}$;

$R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$, and $R^{71}$ represent respectively independently a hydrogen atom, an aliphatic group, or an aromatic group; and $R^2$ and $R^3$, $R^3$ and $R^4$, $R^4$ and $R^5$, $R^5$ and $R^6$, and $R^6$ and $R^7$ optionally may be connected to each other to form rings.

2. An ink-jet ink according to claim 1, wherein the nonionic oil-soluble polymer is a vinyl polymer.

3. An ink-jet ink according to claim 1, wherein the hydrophobic high boiling point organic solvent is at least one hydrophobic high boiling point organic solvent selected from the group consisting of hydrophobic high boiling point organic solvents—represented by the following formulae [S-1] to [S-9]:

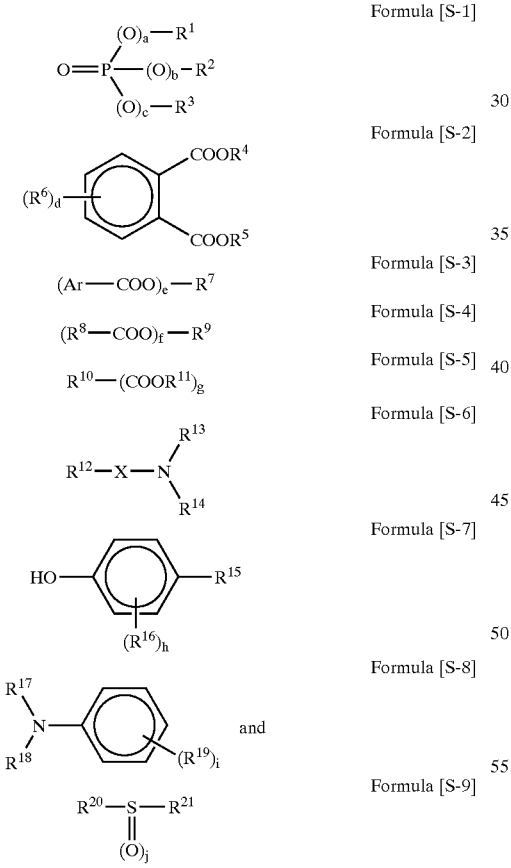

wherein: in the formula [S-1], $R^1$, $R^2$ and $R^3$ each independently represents an aliphatic group or an aryl group, and a, b and c each independently represents 0 or 1;

in the formula [S-2], $R^4$ and $R^5$ each independently represents an aliphatic group or an aryl group, $R^6$ represents a fluorine atom, chlorine atom, bromine atom, iodine atom, alkyl group, alkoxy group, aryloxy group, alkoxycarbonyl group or aryloxycarbonyl group, d represents an integer from 0 to 3, and, where d is more than 1, one $R^6$ may be different from another $R^6$;

in the formula [S-3], Ar represents an aryl group, e represents an integer from 1 to 6, and $R^7$ represents an e-valent hydrocarbon group or a hydrocarbon group that is mutually bonded by an ether bond;

in the formula [S-4], $R^8$ represents an aliphatic group, f represents an integer from 1 to 6, and $R^9$ represents an f-valent hydrocarbon group or a hydrocarbon group that is mutually bonded by an ether bond;

in the formula [S-5], g represents an integer from 2 to 6, $R^{10}$ represents a g-valent hydrocarbon group other than an aryl group, and $R^{11}$ represents an aliphatic group or an aryl group;

in the formula [S-6], $R^{12}$, $R^{13}$ and $R^{14}$ each independently represents a hydrogen atom, aliphatic group or aryl group, X represents —CO— or —$SO_2$—, and a pair $R^{12}$ and $R^{13}$ or a pair $R^{13}$ and $R^{14}$ optionally may bond together mutually to form a ring;

in the formula [S-7], $R^{15}$ represents an aliphatic group, alkoxycarbonyl group, aryloxycarbonyl group, alkylsulfonyl group, arylsulfonyl group, aryl group or cyano group, $R^{16}$ represents a fluorine atom, chlorine atom, bromine atom, iodine atom, aliphatic group, aryl group, alkoxy group or aryloxy group, h represents an integer from 0 to 3, and where h is more than 1, one $R^{16}$ may be different from another $R^{16}$;

in the formula [S-8], $R^{17}$ and $R^{18}$ each independently represents an aliphatic group or an aryl group, $R^{19}$ represents a fluorine atom, chlorine atom, bromine atom, iodine atom, aliphatic group, aryl group, alkoxy group or aryloxy group, i represents an integer from 0 to 4, and when i is more than 1, one $R^{19}$ may be different from another $R^{19}$; and in the formula [S-9], $R^{20}$ and $R^{21}$ each independently represents an aliphatic group or aryl group, and j represents 1 or 2.

4. An ink-jet ink according to claim 1, wherein an amount of content of the hydrophobic high boiling point organic solvent in the coloring composition is 25 to 95% by mass based on the sum of the oil-soluble dye, the nonionic oil-soluble polymer, and the hydrophobic high boiling point organic solvent.

5. An ink-jet ink according to claim 1, wherein an amount of content of the nonionic oil-soluble polymer in the coloring composition is 1 to 70% by mass based on the sum of the oil-soluble dye, the nonionic oil-soluble polymer, and the hydrophobic high boiling point organic solvent.

6. An ink-jet ink according to claim 1, wherein an amount of content of the oil-soluble dye in the coloring composition is 1 to 70% by mass based on the sum of the oil-soluble dye, the nonionic oil-soluble polymer, and the hydrophobic high boiling point organic solvent.

7. An ink-jet ink according to claim 1, wherein an average particle size of dispersed particles in the coloring composition is 100 nm or less.

8. An ink-jet ink according to claim 1, wherein the oil-soluble dye which is represented in said general formula (I) is a compound which is represented in the following general formula (II):

General Formula (II)

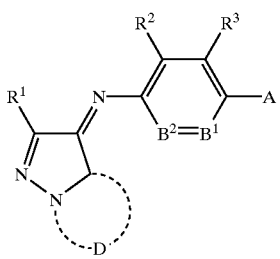

wherein, $R^2$, $R^3$, A, $B^1$, and $B^2$ are synonymous with $R^2$, $R^3$, A, $B^1$, and $B^2$ in said general formula (I);

$R^1$ represents a hydrogen atom, an aliphatic group, an aromatic group, a heterocyclic group, a cyano group, $-OR^{11}$, $SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $COR^{27}$, $-NR^{281985}COR^{29}$, or $NR^{30}SO_2R^{31}$;

$R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ represent respectively independently a hydrogen atom, an aliphatic group or an aromatic group;

D represents an atom group which forms a five-membered nitrogen-containing heterocyclic ring or a six-membered nitrogen-containing heterocyclic ring which optionally may be substituted with an aliphatic group, an aromatic group, a heterocyclic group, a cyano group, $-OR^{81}$, $-SR^{82}$, $-CO_2R^{83}$, $-OCOR^{84}$, $-NR^{85}R^{86}$, $-CONR^{87}R^{88}$, $-SO_2R^{89}$, $-SO^2NR^{90}R^{91}$, $-NR^{92}CONR^{93}R^{94}$, $-NR^{95}CO_2R^{96}$, $-COR^{97}$, $-NR^{98}COR^{99}$ or $-NR^{100}SO_2R^{101}$;

the heterocyclic ring optionally may further form a condensed ring with another ring; and $R^{81}$, $R^{82}$, $R^{83}$, $R^{84}$, $R^{85}$, $R^{86}$, $R^{87}$, $R^{88}$, $R^{89}$, $R^{90}$, $R^{91}$, $R^{92}$, $R^{93}$, $R^{94}$, $R^{95}$, $R^{96}$, $R^{97}$, $R^{98}$, $R^{99}$, $R^{100}$, and $R^{101}$ represent respectively independently a hydrogen atom, an aliphatic group or an aromatic group.

9. An ink-jet ink according to claim 8, wherein the compound which is represented in said general formula (II) is a compound which is represented in the following general formula (III):

General Formula (III)

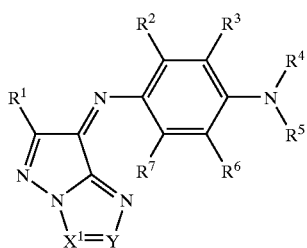

wherein $R^1$, $R^2$ and $R^3$ are synonymous with $R^1$, $R^2$, and $R^3$ in said formula (II);

$R^4$ and $R^5$ represent respectively independently a hydrogen atom, an aliphatic group, an aromatic group, or a heterocyclic group;

$R^6$ and $R^7$ represent respectively independently a hydrogen atom, a halogen atom, an aliphatic group, an aromatic group, a heterocyclic group, a cyano group, $-SR^{51}$, $-SR^{52}$, $-CO_2R^{53}$, $-OCOR^{54}$, $-NR^{55}R^{56}$, $-CONR^{57}R^{58}$, $-SO_2R^{59}$, $-SO_2NR^{60}R^{61}$, $-NR^{62}CONR^{63}R^{64}$, $-NR^{65}CO_2R^{66}$, $-COR^{67}$, $-NR^{68}COR^{69}$, or $NR^{70}SO_2R^{71}$;

$X^1$ and Y represent respectively independently $-C(R^8)=$ or $-N=$;

$R^8$ represents a hydrogen atom, an aliphatic group or an aromatic group; and one of $X^1$ or Y is always $-N=$, and $X^1$ and Y are $-N=$ at different times.

10. An ink-jet ink according to claim 1, wherein the oil-soluble dye of formula (I) is at least one of compounds represented in the following general formulas (IV-1) to (IV-4):

(IV-1)

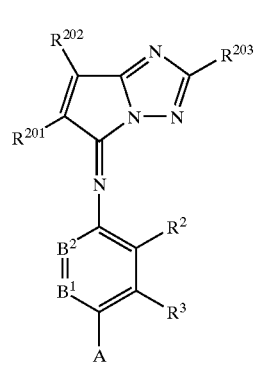

(IV-2)

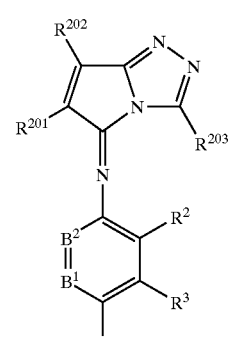

(IV-3)

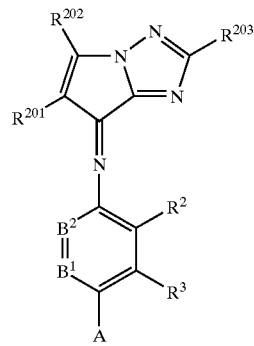

(IV-4)

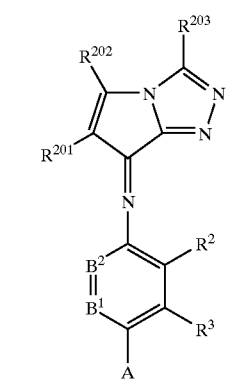

wherein, A, $R^2$, $R^3$, $B^1$, and $B^2$ are synonymous with A, $R^2$, $R^3$, $B^1$, and $B^2$ in said general formula (I);

$R^{201}$, $R^{202}$, and $R^{203}$ represent respectively independently a hydrogen atom, an aliphatic group, an aromatic group, a heterocyclic group, a cyano group, —$OR^{11}$, —$SR^{12}$, —$CO_2R^{13}$, —$OCOR^{14}$, —$NR^{15}R^{16}$, —$CONR^{17}R^{18}$, —$SO_2R^{19}$, —$SO_2NR^{20}R^{21}$, —$NR^{22}CONR^{23}R^{24}$—, $NR^{25}CO_2R^{26}$—$COR^{27}$, —$NR^{28}COR^{29}$, or —$NR^{30}SO_2R^{31}$;

$R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ represent respectively independently a hydrogen atom, an aliphatic group or an aromatic group; and $R^{201}$ and $R^{202}$ optionally may be combined with each other to form a ring structure.

11. A coloring composition formed by dispersing coloring particulates in a water-based medium, the coloring particulates containing a nonionic oil-soluble polymer, a hydrophobic high boiling point organic solvent having a boiling point of 150° C. or more, and an oil-soluble dye, wherein the oil-soluble dye is represented by the following general formula (I):

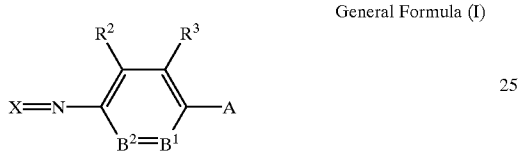

General Formula (I)

wherein, X represents the residue of a color coupler;

A represents —$NR^4R^5$ or a hydroxyl group;

$R^4$ and $R^5$ represent respectively independently a hydrogen atom, an aliphatic group, an aromatic group, or a heterocyclic group;

$B^1$ represents =$C(R^6)$— or =N—;

$B^2$ represents —$C(R^7)$= or —N=;

$R^2$, $R^3$, $R^6$, and $R^7$ represent respectively independently a hydrogen atom, a halogen atom, an aliphatic group, an aromatic group, a heterocyclic group, a cyano group, —$SR^{51}$, —$SR^{52}$, —$CO_2R^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$, or —$NR^{70}SO_2R^{71}$;

$R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$, and $R^{71}$ represent respectively independently a hydrogen atom, an aliphatic group, or an aromatic group; and $R^2$ and $R^3$, $R^3$ and $R^4$, $R^4$ and $R^5$, $R^5$ and $R^6$, and $R^6$ and $R^7$ optionally may be connected to each other to form rings.

12. A coloring composition according to claim 11, wherein said coloring composition is used for an ink composition.

13. An ink jet recording method, in which recording is carried out using an ink-jet ink which contains a coloring composition, the coloring composition being formed by dispersing coloring particulates in a water-based medium, the coloring particulates containing a nonionic oil-soluble polymer, a hydrophobic high boiling point organic solvent having a boiling point of 150° C. or more, and an oil-soluble dye, wherein the oil-soluble dye is represented by the following general formula (I);

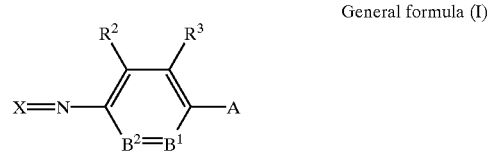

General formula (I)

wherein, X represents the residue of a color coupler;

A represents —$NR^4R^5$ or a hydroxyl group;

$R^4$ and $R^5$ represent respectively independently a hydrogen atom, an aliphatic group, an aromatic group, or a heterocyclic group;

$B^1$ represents =$C(R^6)$— or =N—;

$B^2$ represents —$C(R^7)$= or —N=;

$R^2$, $R^3$, $R^6$, and $R^7$ represent respectively independently a hydrogen atom, a halogen atom, an aliphatic group, an aromatic group, a heterocyclic group, a cyano group, —$SR^{51}$, —$SR^{52}$, —$CO_2R^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$, or —$NR^{70}SO_2R^{71}$;

$R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$, and $R^{71}$ represent respectively independently a hydrogen atom, an aliphatic group, or an aromatic group; and $R^2$ and $R^3$, $R^3$ and $R^4$, $R^4$ and $R^5$, $R^5$ and $R^6$, and $R^6$ and $R^7$ optionally may be connected to each other to form rings.

14. An ink jet recording method according to claim 13, wherein the recording is carried out on a material to be recorded which is provided with an ink receiving layer on a supporting body, and the ink receiving layer includes a porous inorganic pigment.

15. An ink jet recording method according to claim 13, wherein the nonionic oil-soluble polymer is a vinyl polymer.

16. An ink jet recording method according to claim 13, wherein a specific inductive capacity of the hydrophobic high boiling point organic solvent at 25° C. is 3 to 12.

17. An ink jet recording method according to claim 13, wherein an amount of content of the hydrophobic high boiling point organic solvent in the coloring particulates is 25% by mass or more.

18. An ink jet recording method according to claim 13, wherein an average particle size of dispersed particles in the coloring composition is 100 nm or less.

* * * * *